United States Patent
Greytak et al.

(10) Patent No.: US 9,925,478 B2
(45) Date of Patent: Mar. 27, 2018

(54) PURIFICATION OF NANOCRYSTALS BY GEL PERMEATION CHROMATOGRAPHY AND THE EFFECT OF EXCESS LIGANDS ON SHELL GROWTH AND LIGAND EXCHANGE

(71) Applicants: Andrew B. Greytak, Columbia, SC (US); Yi Shen, West Columbia, SC (US)

(72) Inventors: Andrew B. Greytak, Columbia, SC (US); Yi Shen, West Columbia, SC (US)

(73) Assignee: University of South Carolina, Columbia, SC (US)

( * ) Notice: Subject to any disclaimer, the term of this patent is extended or adjusted under 35 U.S.C. 154(b) by 21 days.

(21) Appl. No.: 14/317,396

(22) Filed: Jun. 27, 2014

(65) Prior Publication Data

US 2015/0004310 A1    Jan. 1, 2015

Related U.S. Application Data

(60) Provisional application No. 61/840,735, filed on Jun. 28, 2013.

(51) Int. Cl.
| | | |
|---|---|---|
| *B01D 15/08* | (2006.01) | |
| *C09K 11/02* | (2006.01) | |

(Continued)

(52) U.S. Cl.
CPC .............. *B01D 15/08* (2013.01); *C09K 11/02* (2013.01); *C09K 11/565* (2013.01);

(Continued)

(58) Field of Classification Search
None
See application file for complete search history.

(56) References Cited

U.S. PATENT DOCUMENTS

| 7,794,600 B1 * | 9/2010 | Buretea | B01D 15/08 |
| | | | 210/635 |
| 2002/0045045 A1 * | 4/2002 | Adams | B82Y 15/00 |
| | | | 428/403 |

(Continued)

OTHER PUBLICATIONS

Wang et al, Journal of Chromatography A, 1216, pp. 5011-5019, available online May 3, 2009.*

(Continued)

*Primary Examiner* — Erma C Cameron
(74) *Attorney, Agent, or Firm* — Dority & Manning, PA

(57) ABSTRACT

Methods for purifying nanocrystals via gel permeation chromatography are provided. The method can include: loading a sample solution into a chromatography column, wherein the sample solution comprises nanocrystals coated with a layer of organic ligands; using an eluent, passing the nanocrystals coated with the layer of organic ligands through a stationary phase of the chromatography column, wherein the eluent is an organic solvent in which the nanocrystals coated with the layer of organic ligands remain miscible to form a mobile phase; and collecting the mobile phase passed through the stationary phase of the chromatography column. The surface ligands of the purified nanocrystals can then be, in one embodiment, replaced with a second type of ligand.

18 Claims, 38 Drawing Sheets

(51) Int. Cl.
 C09K 11/56 (2006.01)
 C09K 11/88 (2006.01)
 B22F 1/00 (2006.01)
(52) U.S. Cl.
 CPC ........... *C09K 11/883* (2013.01); *B22F 1/0018* (2013.01); *B22F 1/0062* (2013.01)

(56) References Cited

U.S. PATENT DOCUMENTS

| | | | | |
|---|---|---|---|---|
| 2004/0072427 | A1* | 4/2004 | Sato | B82Y 30/00 438/689 |
| 2006/0088713 | A1* | 4/2006 | Dykstra | B82Y 10/00 428/402 |
| 2006/0157720 | A1* | 7/2006 | Bawendi | C09K 11/565 257/98 |
| 2007/0065665 | A1* | 3/2007 | Sato | B82Y 30/00 428/402 |
| 2012/0049119 | A1* | 3/2012 | Greytak | C09K 11/883 252/301.6 S |

OTHER PUBLICATIONS

Krueger et al, Analytical Chemistry, 77(11), pp. 3511-3515, 2005.*
Kim et al, JACS Communications, 125, pp. 11466-11467, 2003.*
Johnson et al, Journal of Colloid and Interface Science, 458, pp. 310-314, 2015.*
Alamo-Nole, L., etal.; "Preparative size-exclusion chromatography for separation and purification of water-stable Cd-based quantum dots," *Anal. Methods*, 2012, 4, 3127-3132.
Anderson, Nicholas C., etal.; "Soluble, Chloride-Terminated CdSe Nanocrystals: Ligand Exchange Monitored by $^1$H and $^{31}$P NMR Spectroscopy," *Chem. Mater.* 2013, 25, 69-76.
Bai, L., etal.; "Rapid Separation and Purification of nanoparticles in Organic Density Gradients," *J. Am. Chem. Soc.* 2010, 132, 2333-2337.
Bass, J. D., etal.; "An Efficient and Low-Cost method for the Purification of Colloidal Nanoparticles," *Angewandte Chemie International Edition* 2011, 50, 6538-6542.
Beaumont, P. C., etal.; "Photophysical Properties of Laser Dyes: Picosecond Laser Flash Photolysis Studies of Rhodamine 6G, Rhodamine B and Rhodamine 101," *J. Chem. Soc. Faraday Trans.* 1993, 89, 4185-4191.
Biesta, W., etal.; "Preparation, Characterization, and Surface modification of Trifluoroethyl Ester-Terminated Silicon Nanoparticles," *Chem. Mater.* 2012, 24, 4311-4318.
Buhbut, S., etal.; "Quantum dot Antennas for Photoelectrochemical Solar Cells," *J. Phys. Chem. Lett.* 2011, 2, 1917-1924.
Bullen, C. R., etal.; "Nucleation and growth Kinetics of CdSe Nanocrystals in Octadecene," *Nano Lett.* 2004, 4, 2303-2307.
Caldwell, M. A.; etal.; "Driving oxygen coordinated ligand exchange at nanocrystal surfaces using trialkylsilylated chalcogenides," *J. Chem. Commun.* 2011, 47, 556-558.
Canzi, G., etal.; "Diffusion-Ordered NMR Spectroscopy as a Reliable Alternative to TEM for Determining the Size of Gold Nanoparticies in Organic Solutions," *The Journal of Physical Chemistry C* 2011, 115, 7972-7978.
Cazes, J., In *Encyclopedia of Chromatography*; Dekker Encyclopedias New Encyclopedias Series; CRC Press, 2001; p. 833.
Chen, J., etal.; "An oleic acid-capped CdSe quantum-dot sensitized solar cell," *Applied Physics Letters* 2009, 94, 153115-1-153115-3.
Chen, O., etal.; "Compact high-quality CdSe—CdS core-shell nanocrystals with narrow emission linewidths and suppressed blinking," *Nat Mater* 2013, 12, 445-451.
Chen, Y., etal.; "'Giant' Multishell CdSe Nanocrystal Quantum dots with Suppressed blinking," *J. Am. Chem. Soc.* 2008, 130, 5026-5027.
Choi, H. S., etal.; "Renal clearance of quantum dots," *Nature Biotechnology* 2007, 25, 1165-1170.

Clark, M. D., etal.; "Focusing Nanocrystal Size Distributions via Production Control," *Nano Lett.* 2011, 11, 1976-1980.
Cui, J., etal.; "Direct Probe of Spectral Inhomogeneity Reveals Synthetic Tunability of Single-Nanocrystal Spectral Linewidths," *Nat Chem* 2013, advance online publication.(13 pages).
Derrick, T. S., "Analysis of Protein/Ligand Interactions with NMR Diffusion Measurements: The Importance of Eliminating the Protein Background," *Journal of Magnetic Resonance* 2002, 155, 217-225.
Dubois, F., etal.: "A Versatile Strategy for Quantum Dot Ligand Exchange," *J. Am. Chem. Soc.* 2007, 129, 482-483.
Dyadin, Y. A.; etal.; "Double clathrate hydrate of tetrahydrofuran and xenon at pressures up to 15kBar" *Mendeleev Commun.* 1999, 9, 80-81.
Fritzinger, B., etal.; "Utilizing Self-Exchange to Address the binding of Carboxylic Acid Ligands to CdSe Quantum Dots," *J. Am. Chem. Soc.* 2010, 132, 10195-10201.
Gomes, R., etal.; "Binding of Phosphonic Acids to CdSe Quantum Dots: A Solution NMR Study," *J. Phys. Chem. Lett.* 2011, 2, 145-152.
Greytak, A. B., etal.; "Alternating layer addition approach to CdSe/CdS core/shell quantum dots with near-unity quantum yield and high on-tim fractions," *Chem. Sci.* 2012, 3, 2028-2034.
Han, Z., etal.; "Robust Photogeneration of $H_2$ in Water Using Semiconductor nanocrystals and a Nickel Catalyst," *Science* 2012, 338, 1321-1324.
Hassinen, A., etal.; Short-Chain Alcohols Strip X-Type Ligands and Quench the Luminescence of PbSe and CdSe Quanum Dots, Acetonitrile Does Not, *J. Am. Chem. Soc.* 2012, 134, 20705-201712.
Hermans, J. J., etal.; "Some Geometrical Factors in Light-Scattering Apparatus," *J. Opt. Soc. Am.* 1951, 41, 460-464.
Hines, M. A., etal.; "Synthesis and Characterization of Strongly Luminescing ZnS-Capped CdSe Nanocrystals," *Journal of Physical Chemistry* 1996, 100, 468-471.
Hodes, G.; "Comparison of Dye- and Semiconductor-Sensitized Porous Nanocrystalline Liquid Junction Solar Cells," *J. Phys. Chem. C* 2008, 112, 17778-17787.
Jasieniak, J., etal.; "From Cd-Rich to Se-Rich—the Manipulation of CdSe Nanocrystal Surface Stoichiometry," *J. Am. Chem. Soc.* 2007, 129, 2841-2848.
Kalyuzhny, G., etal.; "Ligand Effects on Optical Properties of CdSe Nanocrystals," *J. Phys. Chem. B* 2005, 109, 7012-7021.
Kanelidis, I., etal.: "Inorganic-organic nanocomposites of CdSe nanocrystals surface-modified with oligo- and poly(fluorine) moieties," *J. Mater. Chem.* 2011, 21, 2656-2662.
King, L. A., etal.; "Importance of QD Purification Procedure on Surface Adsorbance of QDs and Performance of QD Sensitized Photoanodes," *J. Phys. Chem. C* 2012, 116, 3349-3355.
Kowalczyk, B., etal.; "Nanoseparations: Strategies for size and/or shape-selective purification of nanoparticles," *Curr. Opin. Colloid Interface Sci.* 2011, 16, 135-148.
Krueger, K. M., etal.; "Characterization of Nanocrystalline CdSe by Size Exclusion Chromatography," *Anal. Chem.* 2005, 77, 3511-3515.
Leatherdale, C. A., etal.; "On the Absorption Cross Section of CdSe Nanocrystal Quantum Dots," *J. Phys. Chem. B* 2002, 106, 7619-7622.
Lees, E. E., etal.; "Experimental Determination of Quantum Dot Size Distributions, Ligand Packing Densities, and Bioconjugation Using Analytical Ultracentrifugation," *Nano Lett.* 2008, 8, 2883-2890.
Li, J. J., etal.; "Large-Scale Synthesis of Nearly Monodisperse CdSe/CdS Core/Shell Nanocrystals Using Air-Stable Reagents via Successvie Ion Layer Adsorption and Reaction," *J. Am. Chem. Soc.* 2003, 125, 12567-12575.
Liu, H. T., etal.; "Mechanistic Study of Precursor Evolution in Colloidal Group II-VI Semiconductor Nanocrystal Synthesis," *Journal of the American Chemical Society* 2007, 129, 305-312.
Liu, J., etal.; "Triton X-114 based cloud point extraction: a thermoreversible approach for separation/concentration and dispersion of nanomaterials in the aqueous phase," *Chem. Commun.* 2009, 1514-1516.

(56) References Cited

OTHER PUBLICATIONS

Liu, W., etal.; Compact Biocompatible Quantum Dots Functionalized for Cellular Imaging, *J. Am. Chem. Soc.* 2008, 130, 1274-1284.
Liu, W., etal.; "Compact Biocompatible Quantum Dots via RAFT-Mediated Synthesis of Imidazole-Based Random Copolymer Ligand," *Journal of the American Chemical Society* 2010, 132, 472-483.
Liu, W., etal.; "Compact Cysteine-Coated CdSe(ZnCdS) Quantum Dots for in Vivo Applications," *J. Am. Chem. Soc.* 2007, 129, 14530-14531.
Majetich, S. A., etal.; "$^1$H NMR Characterization of the CdSe Nanocrystallite Surface," *J. Phys. Chem.* 1994, 98, 13705-13710.
Mattoussi, H., etal.; "Self-Assembly of CdSe—ZnS Quantum dot Bioconjugates Using an Engineered Recombinant Protein," *Journal of the American Chemical Society* 2000, 122, 12142-12150.
Medintz, I. L., etal.; "Quantum dot bioconjugates for imaging, labeling and sensing," *Nat Mater* 2005, 4, 435-446.
Morris-Cohen, A. J., etal.; "Chemical, Structural, and Quantitative Analysis of the Ligand Shells of Colloidal Quantum Dots," *Chem. Mater.* 2013, 25, 1155-1165.
Morris-Cohen, A. J., etal.; "Organic Surfactant-Controlled Composition of the Surfaces of CdSe Quantum Dots," *J. Phys. Chem. Lett.* 2010, 1, 1078-1081.
Morris-Coehn, A. J., etal.; "The Effect of a Common Purifcation Procedure on the Chemical Composition of the Surfaces of CdSe Quantum Dots Sythesized with Trioctylphosphine Oxide," *The Journal of Physical Chemistry C* 2010, 114, 897-906.
Murray, C. B., etal.; "Synthesis and Characterization of Nearly Monodisperse CdE (E=S, Se, Te) Seimconductor Nanocrystallites," *Journal of the American Chemical Society* 1993, 115, 8706-8715.
Owen, J. S., etal.; "Reaction chemistry and ligand exchange at cadmium selenide nanocrystal surfaces," *J. Am. Chem. Soc.* 2008, 130, 12279-12281.
Palui, G., etal.; "Photoinduced Phase Transfer of Luminescent Quantum dots to Polar and Aqueous Media," *J. Am. Chem. Soc.* 2012, 134, 16370-16378.
Peng, X., etal.; "Epitaxial Growth of Highly Luminescent CdSe/CdS Core/Shell Nanocrystals with Photostability and Electronic Accessibility," *Journal of the American Chemical Society* 1997, 119, 7019-7029.
Peng, Z. A., etal.; "Formation of High-Quality CdTe, CdSe, and CdS Nanocrystals Using CdO as Precursor," *J. Am. Chem. Soc.* 2001, 123, 183-184.
Qu, L., etal.; "Control of Photoluminescence Properties of CdSe Nanocrystals in Growth," *J. Am. Chem. Soc.* 2002, 124, 2049-2055.
Ren, L., etal.; "Preparation of Side-Chain 18-e Cobaltocenium-Containing Acrylate Monomers and Polymers," *Macromolecules* 2010, 43, 9304-9310.

Sambur, J. B., etal.; "Influence of Surface Chemistry on the Binding and Electronic Coupling of CdSe Quantum Dots to Single Crystal TiO2 Surfaces," *Langmuir* 2010, 26, 4839-4847.
Shen, Y., etal.; "Purification of Quantum Dots by Gel Permeation Chromatography and the Effect of Excess Ligands on Shell Growth and Ligand Exchange," *Chem Mater.* 2013, 25, 2838-2848.
Smith, A. M., etal.; "A Systematic examination of surface coatings on the optical and chemical properties of semiconductor quantum dots," *Nat Biotech* 2009, 27, 732-733.
Smith, A. M., etal.; "Next-generation quantum dots," *Physical Chemistry Chemical Physics* 2006, 8, 3895-3903.
Snee, P. T., etal.; "Whispering-Gallery-Mode Lasing from a Semiconductor Nanocrystal/Microsphere Resonator Composite," *Advanced Materials* 2005, 17, 1131-1136.
Tagliazucchi, M., etal.; Ligand-Controlled Rates of Photoinduced Electron Transfer in Hybrid CdSe Nanocrystal/Poly(viologen) Films, *ACS Nano* 2011, 5, 9907-9917.
Talapin, D. V., etal.; "Highly Luminescent Monodisperse CdSe and CdSe/ZnS Nanocrystals Synthesized in a Hexadecylamine-Trioctylphosphine Oxide-Trioctylphospine Mixture," *Nano Lett.* 2001, 1, 207-211.
Van Embden, J., etal; "Mapping the Optical Properties of CdSe/CdS Heterostructure Nanocrystals: The Effects of Core Size and Shell Thickness," *J. Am. Chem. Soc.* 2009, 131, 14299-14309.
Virieux, H., etal.; "InP/ZnS nanocrystals: Coupling NMR and XPS for fine surface and interface description," *J. Am. Chem. Soc.* 2012, 134, 19701-19708.
Wang, M., etal.; "Colloidal CdSe Nanocrystals Passivated by a Dye-Labeled Multidentate Polymer: Quantitative Analysis by Size-Exclusion Chromatography," *Angew. Chem. Int. Ed.* 2006, 45, 2221-2224.
Wang, M., etal.; "Preparative size-exclusion chromatography for purification and characterization of colloidal quantum dots bound by chromophore-labeled polymers and low-molecular-weight chromophores," *Journal of Chromatography A* 2009, 1216, 5011-5019.
Wu, X., etal.; "Immunofluorescent labeling of cancer marker Her2 and other cellular targets with semiconductor quantum dots," *Nat Biotech* 2003, 21, 41-46.
Xie, R., etal.; "Synthesis and Characterization of Highly Luminescent CdSe-Core CdS/Zn0.5Cd0.5S/ZnS Multishell Nanocrystals" *J. Am. Chem. Soc.* 2005, 127, 7480-7488.
Yang, Y., etal.; "Characterization of multivalent lactose quantum dots and its application in carbohydrate-protein interactions study and cell imaging," *Bioorganic & Medicinal Chemistry* 2010, 18, 5234-5240.
Zhu, H., etal.; "Wave Function Engineering for Ultrafast Charge Separation and Slow Charge Recombination in Type II Core/Shell Quantum Dots," *J. Am. Chem. Soc.* 2011, 133, 8762-8771.

\* cited by examiner

PURIFICATION OF NANOCRYSTALS BY GEL PERMEATION CHROMATOGRAPHY AND THE EFFECT OF EXCESS LIGANDS ON SHELL GROWTH AND LIGAND EXCHANGE

PRIORITY INFORMATION

The present application claims priority to U.S. Provisional Patent Application Ser. No. 61/840,735 titled "Purification of Quantum Dots by Gel Permeation Chromatography and the Effect of Excess Ligands on Shell Growth and Ligand Exchange" of Greytak, et al. filed on Jun. 28, 2013, the disclosure of which is incorporated by reference herein.

BACKGROUND

Colloidal nanocrystals (NCs) are considered to be highly valuable in variety of applications. For example, semiconductor nanocrystals, also known as quantum dots (QDs), are considered as a promising candidate to be applied in the areas of solar cells, photocatalysis, and biological imaging due to their attractive properties including higher molar extinction coefficients and better photo stability compared to organic molecular fluorophores, and rationally tunable emission wavelengths. The most widely used synthetic procedure for QDs is the hot-injection method, in which molecular precursors are combined at high temperature, initiating a nucleation and growth process in which polydispersity is minimized by intentionally quenching the reaction before all of the precursors are consumed. The resulting QDs are coated with a layer of surfactant molecules (ligands, also "caps") that provides charge balance and colloidal stability, but as-synthesized samples also contain unreacted precursors as well as reaction byproducts, high-boiling solvent(s), and/or an excess of ancillary ligands added to control growth and improve stability. Applications almost universally require purification and/or surface modification of the as-synthesized QDs: (1) for optical applications, the as-synthesized QDs are not very bright, which requires the formation of an inorganic shell to increase the quantum yield (QY); (2) for bio-imaging applications, surface modification by encapsulation or ligand exchange is essential for water solubility; (3) for electronic applications, excess ligands adsorbed on the surface hinder the charge transfer between the QDs and receiving substrates. These examples demonstrate that effective means for the isolation of NCs with well-defined surface properties is essential to the applications of NCs in solution or assembled into matrices, and is also a necessary condition for the development of sequential preparative chemistry for NC-based structures.

The traditional method for purification of NCs is a sequential precipitation and redissolution (PR) process. For the frequent case of NCs sterically stabilized by ligands with long hydrocarbon tails in nonpolar phase (e.g. hexane, toluene, chloroform or tetrahydrofuran), flocculation of NCs is achieved by introducing anti-solvents (e.g. acetone, methanol, isopropanol) to increase the polarity of the solvent mixture. Impurities that remain soluble can then be decanted away, and the NCs redissolved in a suitable solvent.

While the PR method is convenient and scalable, it carries several limitations. Fundamentally, the separation is based on solubility; for differently-prepared batches of NCs the necessary precipitation conditions are not identical since the intermolecular forces governing the solubility of the as-synthesized NCs are not inherently controlled properties. Some impurities may have solubility properties similar to the NCs, such that multiple PR cycles are necessary for complete removal. From a practical perspective, in some cases, the amounts of polar anti-solvents that are used are not tightly controlled, but even if these procedures are performed systematically, the turbidity that is considered to represent adequate precipitation of the NCs is often a subjectively determined parameter; this can lead to run-to-run variability and present difficulties in adequately describing procedures in literature. An important consideration for any NC purification method is the effect not only on the amounts of unbound species remaining in the sample, but also the effect on the number and type of bound ligands that terminate the NC surface. In the case of the PR method, the introduction of a foreign solvent can perturb the NC surface by displacing native ligands, as has recently been reported for the case of NCs purified by PR with methanol as the anti-solvent.

The strong dependence of the photophysical properties and chemical reactivity of NCs on the surface ligand population has helped to motivate increasing interest in alternative nanoparticle purification methods. Methods including extraction processes, ultracentrifugation and electrophoretic deposition have been established to purify the as-synthesized NCs in non-polar solutions. However, these methods come with a phase transfer during the NCs purification process, require specialized equipment, and present limitations in scalability.

As such, a need exists for an improved method for purification of NCs. The relatively large size of NCs compared to small molecules makes size-exclusion chromatography (SEC) an attractive technique. However, until now size-exclusion chromatography has not been described as a method to isolate natively-capped colloidal NCs in organic solution as the basis for further manipulations, nor has its efficacy as a purification technique been compared directly to precipitation-based methods.

SUMMARY

Objects and advantages of the invention will be set forth in part in the following description, or may be obvious from the description, or may be learned through practice of the invention.

Methods are generally provided for purifying nanocrystals via gel permeation chromatography. In one embodiment, the method includes: loading a sample solution into a chromatography column, wherein the sample solution comprises nanocrystals coated with a layer of organic ligands; using an eluent, passing the nanocrystals coated with the layer of organic ligands through a stationary phase of the chromatography column, wherein the eluent is an organic solvent in which the nanocrystals coated with the layer of organic ligands remain miscible to form a mobile phase; and collecting the mobile phase passed through the stationary phase of the chromatography column. The surface ligands of the purified nanocrystals can then be, in one embodiment, replaced with a second type of ligand (e.g., a different type of organic ligand).

Additionally, methods are provided for preparing core-shell nanoparticles. In one embodiment, the method can include: loading a sample solution into a chromatography column, wherein the sample solution comprises nanoparticle core particles coated with a layer of organic ligands; using a eluent, passing the nanocrystals coated with the layer of organic ligands through a stationary phase of the chromatography column, wherein the eluent is a solvent for the nanoparticle cores coated with the layer of organic ligands to form a mobile phase; collecting purified nanoparticles from the mobile phase passed through the stationary phase of the chromatography column; and thereafter, forming a shell onto the purified nanoparticles.

Methods are also generally provided for preparing nanoparticles in which the surface ligand composition differs from the ligands that reside following synthesis of the colloidal phase, and includes a specified ligand. In one embodiment, the method includes: loading a sample solution into a chromatography column, wherein the sample solution comprises nanoparticle core particles coated with an initial layer of organic ligands; using a eluent, passing the nanocrystals coated with the initial layer of organic ligands through a stationary phase of the chromatography column, wherein the eluent is an effective solvent for the nanoparticle cores coated with the initial layer of organic ligands, the nanoparticle cores coated with the specified ligand, and/or the nanoparticle cores coated with a mixture of the initial and specified ligand, and the eluent contains the specified ligand at a concentration such that occupation of the nanoparticle surface by the specified ligand is achieved within the elution time; and collecting purified nanoparticles from the mobile phase passed through the stationary phase of the chromatography column.

Other features and aspects of the present invention are discussed in greater detail below.

BRIEF DESCRIPTION OF THE DRAWINGS

A full and enabling disclosure of the present invention, including the best mode thereof to one skilled in the art, is set forth more particularly in the remainder of the specification, which includes reference to the accompanying figures, in which:

FIG. 1A shows a CdSe QD sample (CdSe1). The sample concentrations (shown by the square points) were measured by UV-Vis and normalized to the concentration of the injection solution (considered as 100). IV=injection volume. TV=total volume of column.

FIG. 1B shows the GPC traces of a CdSe/CdZnS QD sample (CdSe/CdZnS1). The sample concentrations (shown by the square points) were measured by UV-Vis and normalized to the concentration of the injection solution (considered as 100). IV=injection volume. TV=total volume of column.

FIG. 1C shows the GPC traces of an elution of alizarin in toluene and small molecule representative dye. The sample concentrations (shown by the square points) were measured by UV-Vis and normalized to the concentration of the injection solution (considered as 100). IV=injection volume. TV=total volume of column.

FIG. 2B showing absorption spectra of CdSe/CdZnS1 (normalized to the $1^{st}$ absorption peak at ~535 nm) purified by 1PR and 1GPC; and FIG. 2C showing the lowest energy extinction peak position shift of GPC purified CdSe1 upon incubation at high temperature.

DETAILED DESCRIPTION

Figure 1A:
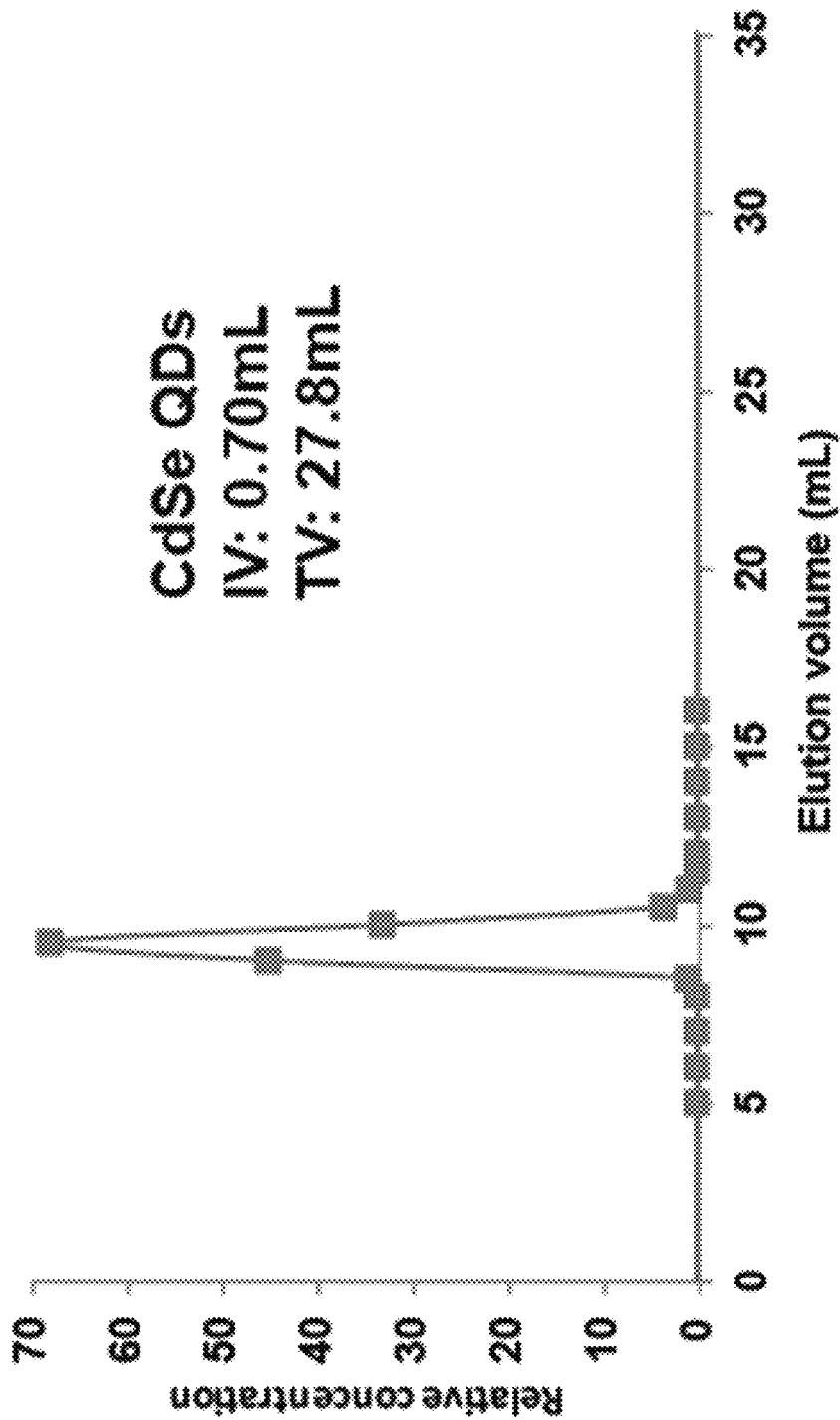
FIG. 1A-1C show the GPC traces of representative colloidal QD samples and a representative small molecule dye for comparison.

Reference now will be made to the embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied exemplary constructions.

A highly precise and effective gel permeation chromatography (GPC) purification technique is generally provided herein for NCs. GPC is a type of size exclusion chromatography (SEC) that operates with an organic mobile phase and is widely used in characterization of macromolecules such as polymers. As with any SEC technique, GPC employs a mobile phase that is a solvent for the mixture to be separated; the mixture passes through a stationary phase and subsequently fractionates, with elution volumes that directly correlate with the hydrodynamic size of the analytes. Roman's group and others have used SEC with an aqueous mobile phase to analyze or reduce the size distribution of aqueous QD samples or to separate QDs from dye molecules. SEC with aqueous mobile phase is often described as a form of gel filtration chromatography (GFC) and usually requires different methods, stationary phases, and is useful for different samples than GPC with an organic mobile phase. Winnik's group has described a method for using GPC to separate Cd-based colloidal QDs from excess polymers following surface modification, but not as a method to purify colloidal QDs with native small-molecule ligands. Colvin's group has described a method for using analytical high-performance SEC to measure the size distribution of colloidal QDs with an organic mobile phase composed of a solution of free ligand in an organic solvent. Biesta and co-workers described a method for using preparative GPC with acetonitrile solvent and PLGel stationary phase to remove unbound dye molecules from surface-modified silicon nanoparticles, but with limited recovered yield. However, until now chromatography has not been described as a method to isolate natively-capped NCs as the basis for further manipulations, nor has its efficacy as a purification technique been compared directly to precipitation-based methods.

Thus, GPC purification provides a preparative-scale, consistent, size-based purification of NCs without perturbing the solvent environment, and as such could serve as the basis for advanced syntheses and enable detailed measurements of NC surface chemical properties.

The use of gel permeation chromatography (GPC) is generally provided as a method for separating NCs from small-molecule impurities in hydrophobic solvents. In one particular embodiment, use of gel permeation chromatography (GPC) is generally provided as a method for separating natively-capped colloidal CdSe and CdSe/Cd$_x$Zn$_{1-x}$S quantum dots (QDs) from small-molecule impurities in hydrophobic solvents. GPC can also be used to purify other materials, such as nanorods and/or nanoparticles as discussed in greater detail below.

GPC purifies the NCs of their synthetic impurities and excess ligands on the basis of hydrodynamic size by a fixed separation driving force with high resolution. The mobile phase for this chromatographic technique is an organic solvent in which the NCs remain miscible, and therefore affords a single phase purification that does not risk perturbing the original binding environment. Polarity is an essential factor in the precipitation of NCs; however, due to its variance among different NC batches and uncertainty as to the solubility characteristics of undesired impurities and/or excess ligands, it is an unreliable property on which to base the isolation of NCs. Furthermore, many NCs like core/shell QDs can present solubility limitations after multiple precipitations, which are amply circumvented by the GPC purification technique.

In providing a relatively clean and highly stable NC surface, GPC purification has the potential to contribute significant value in investigations of ligand exchange, ligand-mediated growth of inorganic layers, and other nanoparticle/ligand interactions. For example, it is believed that future applications of this purification method can enable measurement of surface ligand exchange reactions of NCs with well-defined mass action relationships, address the role of weakly and/or neutrally-binding ligands in controlling non-radiative recombination, and perhaps most importantly, contribute to the development of quantifiable metrics of sample quality that allow NCs batches prepared in different settings to be used interchangeably in applications or as the basis for further synthetic work.

The mobile phase is generally formed from the organic solvent or solvent mixture serving as the eluent. Particularly suitable organic solvents can include, but are not limited to, toluene, benzene, xylene, tetrahydrofuran, anisole, carbon tetrachloride, chloroform, dichloromethane, methylene chloride, perchloroethylene, dimethylformamide, pyridine, acetonitrile, trichlorobenzene, ketones, aromatics, linear alkanes, branched alkanes, linear olefins, branched olefins, or mixtures thereof. As stated, the mobile phase could be a mixture of such solvents, or a mixture of such a solvent with a specified concentration of a molecular substance that associates strongly or weakly with the nanocrystal surface (a ligand) in order to arrive at an eluted product with a programmed free ligand concentration.

The stationary phase is selected from size-exclusion media that are able to retain small molecules in commonly-recognized hydrophobic, anhydrous, or aprotic solvents. Non-polar materials, such as polystyrene materials, PLgel (Agilent), a cross-linked dextran gel such as sold under the name Sephadex® (General Electric Company), a cross-linked polyacrylamide (Bio-Gel® from Bio-Rad), agarose gel and Styragel® (Waters), may be particularly suitable for the stationary phase, since the non-polar material inhibits chemical interaction between the NCs and the stationary phase so that separation relies primarily on the physical interaction.

Colloidal nanocrystals are crystalline or polycrystalline particles with typical dimensions less than 1000 nanometers that can be formed, handled, or used as a component of a colloidal solution. Colloidal nanocrystals may encompass a range of volumes and shapes including spherical, rod-like (nanorod), and plate-like shapes or others. Colloidal nanocrystals composed of compounds that are known to behave electrically as semiconductors in the bulk phase can be described as colloidal semiconductor nanocrystals. Colloidal nanocrystals with dimensions that lead to observable changes in electronic energy level positions and separation when compared to the bulk phase, characteristic of a quantum dot, can be described as colloidal nanocrystal quantum dots; those skilled in the art will recognize that the term "colloidal quantum dots" is frequently used to refer to colloidal semiconductor nanocrystals with the properties of quantum dots. The work below refers to a method for purification of colloidal nanocrystals including those that can be described as colloidal semiconductor nanocrystals or quantum dots.

The presently described methods can be utilized on a wide range of NCs. Particularly suitable nanoparticles to be separated include colloidal nanocrystals that can be dispersed in the mobile phases described, especially including elements or compounds that in their bulk forms are metallic, semiconducting, or insulating and that are colloidally stabilized by the presence of adsorbed molecular ligands, or mixtures thereof. For example, metals such as gold, silver, and/or platinum are included, as well as semiconductors such as Si, Ge; CdS, CdSe, CdTe, ZnS, ZnSe, ZnTe, and the like (II-VI semiconductors); InP, InAs, InSb, GaAs, and the like (III-V semiconductors); PbS, PbSe, SnS, and the like (IV-VI semiconductors); ZnO, TiO$_2$, In$_2$O$_3$, and the like (oxide semiconductors); and ternary or quaternary compounds such as those of copper, zinc, tin, and sulfur (CZTS) and SrTiO$_3$; and compounds that contain polyatomic cations such as methylammonium lead iodide, when these can be stabilized as colloids in organic solvents. The methods can also be utilized on heterostructured colloidal nanoparticles including more than one solid phase, including core/shell structures. Each of these elements or compounds may exist in more than one allotropic phase.

Reasonable substances to be separated from the nanoparticles on the basis of this chromatography include constituents of the initial mixture that are soluble in the mobile phase and experience significant retention on the size exclusion medium. These include, but are not limited to, intentionally added or adventitious species that exhibit minimal affinity for the nanoparticles in the mobile phase, and species that do exhibit significant binding interactions with the nanoparticles in the mobile phase but are separable through GPC. The first of these classes is referred to as impurities while the second class may be referred to as impurities or "excess ligands" by those in the field.

The nanoparticles may be stabilized, kinetically or thermodynamically, as a colloidal solution by the presence of a surface layer that is distinct from the colloidal phase; the components of this layer are termed ligands (occasionally surfactants) especially if they contain elements not present in the colloidal phase, are small molecules or derivatives thereof or would be recognized as ligands by those in the field. Such ligands may be present following the initial synthesis of the colloidal phase from chemically distinct starting materials. A portion of these may be sufficiently strongly bound to the nanoparticles that this portion is retained on the nanoparticle surface following purification by gel permeation chromatography as described. Reasonable examples of strongly-bound ligands could include carboxylic acids/carboxylates, phosphonic acids/phosphonates, pyrophosphonates, thiols and thiolates, dithiocarbamates, phosphines, phosphine oxides, metal carboxylate complexes, metal phosphonate carboxylates, halides, and others that would be recognized as representative ligands for the colloidal phase used.

The examples demonstrated herein utilize gravity to induce the flow of the mobile phase and rely upon manual collection of eluted samples. The use of a more sophisticated machine to control flow rates, collect eluted samples, and provide online measurement of effluent (for example by spectroscopy) should not be considered to evade the intellectual content of the methods described in the examples provided.

EXAMPLE 1

It was demonstrated that gel permeation chromatography can be used as a simple and highly effective technique to purify monodisperse samples of both CdSe QDs and CdSe/$Cd_xZn_{1-x}S$ core/shell QDs from by-product and excess ligand impurities present following synthesis. These extremely common core and core/shell QDs can be purified by GPC with more confidence and better reproducibility than the traditional precipitation/redissolution purification processes.

A variety of spectroscopic methods (including NMR, DOSY and electronic absorption), elemental analysis, thermogravimetric analysis and surface modification techniques have been combined in order to present a systematic analysis of the GPC purification of the QDs. These combined analyses provide qualitative and quantitative information about the QD surface, and validate both the feasibility and efficiency of the GPC purification. The maintenance of absorption features confirmed that the GPC purification did not cause the QDs to aggregate or etch. Whether compared to 1PR, 2PR or 6PR purifications, the GPC-purified QDs exhibited smaller ligand/QD ratios and remarkable stability at both room and high temperatures.

The surface modification experiments that were performed on the core and core/shell QDs, coupled with the analyses above, demonstrated that constituents of crude QD samples that may remain following precipitation/redissolution purification can be effectively removed by GPC, and can have a profound effect on subsequent surface modification reactions. It is clear that studies of the mechanistic details of such reactions, which are of primary concern for proposed fluorescence and optoelectronic applications of QDs, must be conducted in view of the possible roles of impurities and excess ligands.

A range of analysis techniques, including $^1$H NMR, diffusion-ordered NMR analysis (DOSY), and thermogravimetric analysis (TGA) have been used to compare the nature and quantities of ligands adsorbed on the QDs after GPC and after alternative purification methods. It was discovered that the GPC purified samples display lower ligand-to-QD ratio (135 oleate substituents per nanocrystal for CdSe QDs with lowest-energy absorption peak at 534 nm) than what can be achieved by the multiple precipitation/redissolution method, and the GPC purified samples are stable at both room temperature and high temperature (180~200° C. for CdSe QDs). The achievement of an efficient and highly reproducible method for the preparation of clean QD samples allowed us to test whether impurities that reside in samples prepared by standard purification methods have a significant effect on further surface modification reactions. The present inventors found that the reactivity of CdSe QDs towards precursors for CdS shell growth was profoundly affected by the presence of excess ligands in impure QD samples prepared by multiple precipitations, and that the removal of excess ligands and impurities significantly improved the speed and reliability by which water-soluble CdSe/$Cd_xZn_{1-x}S$ QDs could be prepared by ligand exchange with cysteine.

The present inventors used GPC with a polystyrene stationary phase as a technique to purify two types of as-synthesized nanoparticles: CdSe QDs and CdSe/$Cd_xZn_{1-x}S$ core/shell QDs. CdSe QDs display effective bandgaps that can be tuned across much of the visible range and enjoy an extensive literature background concerning their synthesis and reaction chemistry, while CdSe/$Cd_xZn_{1-x}S$ QDs have been proven to maintain high QY after hydrophilic ligand exchange and are suitable for practical fluorescence applications. Compared with the PR purified samples, the GPC purified QDs exhibited significantly smaller ligand/QD ratios, similar stability at room temperature and even better stability at high temperature (towards precipitation and/or ripening). Furthermore, it was demonstrated that CdS shell growth on the same CdSe QDs with different purification methods, and cysteine ligand exchange on CdSe/$Cd_xZn_{1-x}S$ QDs to reveal how impurities and excess ligands can alter the surface chemical reactions of the QDs.

A number of qualitative and quantitative analytical techniques were performed to verify the effectiveness of the GPC as a single phase purification method that maintains the native surface environment of the QDs. Metrics such as these may be able to classify QDs purified by any method sufficiently well that subsequent reaction chemistry and physical properties can be predicted with confidence.

Experimental Section

Materials The following chemicals were used as received. Cadmium oxide (CdO; 99.999%), Zinc oxide (ZnO; 99.999%), Trioctylphosphine (TOP; 97%) and Trioctylphosphine oxide (TOPO; 99%) were purchased from STREM Chemicals. Oleic Acid (99%), 1-Octadecene (ODE; 90% technical grade), 1-Tetradecylphosphonic Acid (TDPA; 98%), Selenium (Se; 99.999%) and L-Cysteine (98$^+$%) were purchased from Alfa Aesar. Bio-Beads S-X1 GPC medium was obtained from Bio-Rad Laboratories, Inc. Toluene-$d_8$ (D, 99.5%) and Tetrahydrofuran-$d_8$ (THF; D, 99.5%) were obtained from Cambridge Isotope Laboratories, Inc. Decylamine (95%) was purchased from Sigma Aldrich. Oleylamine (80-90%) and Bis(trimethylsilyl) sulfide (($TMS)_2S$; 95%) were purchased from Acros Organics. Rhodamine Chloride 590 (R590, MW 464.98) was obtained from Exciton. Toluene (99.5% ACS analysis grade) was purchased from Mallinckrodt Chemicals. 200 Proof Ethyl Alcohol (Ethanol) was obtained from Decon Laboratories, Inc. Acetone (99.9%) was purchased from VWR. Methanol (99.9%) was purchased from Fisher Scientific. Synthetic or analytical procedures either under nitrogen ($N_2$) or vacuum environment were carried out using Schlenk line techniques, or a glovebox.

Synthesis of CdSe QDs. Two types of CdSe QDs with different Cd/Se preparation ratios were synthesized to test the tolerance of the GPC purification toward different Cd based QDs. The synthetic procedure follows a previously published hot-injection method.

CdSe1 QDs: 60 mg CdO and 330 mg oleic acid were introduced into a three-neck flask with 6 mL ODE as the noncoordinating solvent. The flask was heated to 100° C. and vacuum was applied to remove air and water from the system. The flask was continuously heated to 270° C. under $N_2$ environment to produce a colorless and clear mixture. Afterward, the reaction mixture was cooled to 130° C. and vacuum was applied again to remove evolved water. The mixture was reheated to 270° C. under $N_2$ and 0.64 mL TOPSe solution (prepared by dissolving Se in TOP in a glove box, with concentration 2.2M) was quickly injected. The reaction flask was allowed to cool down in ambient air to room temperature. The ratio between Cd:Se:oleic acid is 1:3:2.5 and the lowest energy extinction peak is at 534 nm.

CdSe2 QDs: 90 mg CdO and 500 mg oleic acid were used to prepare the Cd precursor. CdO was converted to the oleate using the same procedure as described above. The flask was reheated to 280° C. and 0.32 mL 2.2M TOPSe solution was quickly injected. The reaction flask was immediately cooled down under a stream of air. The ratio between Cd:Se:oleic acid is 1:1:2.5 and the lowest energy extinction peak is at 529 nm.

Synthesis of CdSe/$Cd_xZn_{1-x}S$ QDs. A selective ionic layer adhesion and reaction (SILAR) approach was used to grow CdSe/$Cd_xZn_{1-x}S$ core/shell QDs. The CdSe core is synthesized by hot-injection method with tetradecylphosphonic acid (TDPA). After precipitation/redissolution purification process, the alloy shell was over coated by alternating injections of a Cd(oleate)$_2$ and Zn(oleate)$_2$ mixture as the metal precursor and bis(trimethylsilyl)sulfide ((TMS)$_2$S) as the sulfur precursor. There are two samples of CdSe/$Cd_xZn_{1-x}S$ QDs with similar synthetic procedures on which the GPC was tested, labeled as CdSe/CdZnS1 and CdSe/CdZnS2. In both samples the nominal value of x was 0.3 (CdSe/$Cd_{0.3}Zn_{0.7}S$) based on the ratio of Cd to Zn precursors added during shell synthesis.

GPC Column Packing. To pack the preparative column, 4~5 g of Bio-Beads were first swollen in toluene overnight. 5 mL clean toluene was placed in the glass column (inner diameter~1 cm) with a filter (0.2 μm pore size filter and glass wool) and a Teflon valve. All of the swollen beads were transferred to the column. After the gel settled down and formed the column with a height of approximately 31~38 cm, toluene was used to rinse the column until no free polystyrene was present in the eluent (tested by UV-Vis absorption).

QD Purification: Precipitation/Redissolution Process. A portion of the as-synthesized QD batch was centrifuged to remove any undissolved material. Acetone and methanol were used as the anti-solvent to precipitate the QDs (for CdSe QDs, both acetone and methanol were used; for CdSe/$Cd_xZn_{1-x}S$ QDs, acetone alone can flocculate the solution). After centrifuging for 5 minutes, the QDs can be separated from the mixture. For CdSe QDs, the spin speed is 8000 rpm (8228×g), while it is 5000 rpm (3214×g) for the CdSe/$Cd_xZn_{1-x}S$ QDs. The QDs were redissolved in toluene and labeled as 1 time precipitation/redissolution purified sample (1PR). By repeating the above process, we obtained 2 times PR purified samples (2PR) and also a 6 times PR purified sample (6PR).

QD Purification: GPC Purification Process. In order to remove most of the synthetic solvent and concentrate the QD sample in toluene, we always carried out a single PR cycle before the GPC purification. 1PR QDs (concentration ranges from 5~150 μM with 0.5~1 mL injection volumes) were added to the GPC column with toluene as the eluent. The sample was collected when the elution volume equaled ~⅓ of the total volume of the column (the expected void volume for irregularly spaced spherical beads); this volume corresponds to the fraction at which the purified QDs eluted. The total volume we collected after GPC purification is approximately 2 mL (more than 95% of the QDs will come out in this range) and the solution was labeled GPC purified sample (1GPC). We also obtained 2 times GPC purified samples (2GPC) by reusing the column to purify the 1GPC samples a second time.

CdS Shell Growth on CdSe Core Titration Experiment. After having been purified by different methods, the solution of QDs in toluene was transferred to a growth flask with an added solvent of 1:2 oleylamine:ODE (v/v, 9 mL total) and degassed at 100° C. to remove the toluene. Before addition of the reagent via syringe pump (J-KEM Scientific Dual Syringe Pump, Model 2250), the flask was heated to 200° C. under nitrogen. The Cd precursor is prepared by diluting 0.2M Cd(oleate)$_2$ in ODE with 2 equivalents of decylamine and a volume of TOP to yield a Cd concentration of 0.1M. The S precursor is a 0.1M solution of (TMS)$_2$S in TOP. The CdSe core radius was estimated by a calibration curve for its radius as a function of the position of the lowest energy absorption peak. The volume increase associated with 1 monolayer coverage of CdS is calculated based on the radius increase of 0.337 nm, which is half of the wurtzite c-axis unit cell dimension for CdS. We chose to apply dosage equivalents to approximately 0.1 monolayer incremental shell thickness in each injection in order to observe the shell growth progression. Each injection started every 10 minutes with 3 minutes dosing and 7 minutes delay to ensure the completion of the reaction. After dosing 1 monolayer (10 injections) of one precursor, the other precursor was introduced until the lowest energy absorption peak stopped redshifting.

Cysteine Ligand Exchange Reaction for CdSe/$Cd_xZn_{1-x}S$ QDs The ligand exchange reaction was performed by a modification of a published method. Purified QDs samples were mixed with 1 mL L-Cysteine solution (prepared by dissolving 40 mg L-cysteine in 1 mL pH=7.4 phosphate buffer solution). The biphasic mixture was stirred vigorously at room temperature for 1 hour, by which time we observed the color transfer to the aqueous phase. The QDs were precipitated once by ethanol/hexane, redissolved in pH=8 buffer solution and filtered by polyethersulfone membrane (pore size: 0.2 μm) for further analysis.

Optical Spectroscopy. The formation of CdSe QDs and CdS or $Cd_xZn_{1-x}S$ shell on the surface was monitored by the absorption spectrum from UV-Vis spectroscopy. The optical absorption spectrum was recorded using a Thermo Scientific Evolution Array UV-Visible Spectrophotometer with toluene as the solvent as well as the blank in a 1 cm path quartz cuvette. The fluorescence spectra were also used to monitor the growth and size distribution of the QDs. Emission spectra were recorded by an Ocean Optics USB 4000 spectrometer under ~365 nm excitation.

NMR Analysis of QDs. Routine NMR samples of the QDs were prepared in toluene-d$_8$. The QDs' concentration is set at approximately 60~100 μM for CdSe QDs and 5~10 μM for CdSe/$Cd_xZn_{1-x}S$ QDs; the exact value in each case was measured by UV-Vis using the calculated molar extinction coefficient. The qualitative $^1$H NMR spectra were recorded on a Varian Mercury/VX 300 NMR. The quantitative $^1$H NMR spectra were recorded on a Varian Mercury/VX 400 NMR with THF as the internal standard. The relaxation delay used is 26 s and the acquisition time is 3 s, which in total is equal to $5 \times T_1$ of the THF peak at around 3.5 ppm ($T_1$=5.8 s) and much greater than the $5 \times T_1$ of the olefin peak of the oleic acid ($T_1$=0.8 s), allowing the system to reach a reliable equilibrium. The $T_1$ experiments were performed by using the standard inversion-recovery pulse sequences (180° pulse - - - delay - - - 90° pulse).[43] Diffusion measurements were performed on a Varian Mercury/VX 400 using the vendor-supplied Doneshot pulse sequence. QDs were dissolved in THF-$d_8$ and spectra were recorded with 100 ms diffusion delay and 2 ms diffusion gradient length. Diffusion ordered spectroscopy (DOSY) analysis was done using the routines incorporated in the VnmrJ 2.2D software. The spectra of oleic acid and ODE in toluene-$d_8$ were recorded on a Varian Mercury/VX 400. The $^{31}$P NMR spectra of CdSe1 (concentration around 100 μM) samples were measured by a Bruker Avance III HD 400 with 512 scans.

Thermogravimetric Analysis (TGA). Samples were prepared by concentrating them under vacuum, and then transferring them to the platinum pan in liquid form (colloidal QDs are difficult to transfer in solid form). TGA was conducted on a TA Instruments Q5000 with a heating rate of 10° C./min from 40° C. to 650° C. under constant nitrogen flow.

Inductively Coupled Plasma-Mass Spectrometry Analysis. Inductively coupled plasma-mass spectrometer (ICP-MS) samples were prepared by drying the CdSe QDs solution via vacuum and digesting the samples in 2 mL aqua regia. The concentrations of both Cd and Se were detected by a Thermo-Finnigan Element XR ICP-MS.

Quantum Yield Measurement. The quantum yield (QY) of the CdSe/Cd$_x$Zn$_{1-x}$S QD samples was measured relative to rhodamine 590 (R590, QY=99% in ethanol). The excitation wavelength was chosen based on the optical isosbestic point of the QDs-toluene solution and R590 in ethanol. Fluorescence spectra of QD and R590 dye were taken under identical spectrometer conditions on Varian fluorescence spectrometer in triplicate and averaged. The optical density was kept below 0.1 between 500 and 800 nm to avoid internal filtering effects. The QY was calculated based on the integrated intensities of the emission spectra, the absorption at the excitation wavelength and the refraction index of the solvent:

$$QY_{QDs} = QY_{dye} * \frac{Absorbance_{dye}}{Absorbance_{QDs}} * \frac{Emission\ integral_{QDs}}{Emission\ integral_{dye}} * \frac{Refraction\ index_{toluene}^2}{Refraction\ index_{ethanol}^2}$$

The precision of this measurement in our case is limited by the precision of the absorbance measurement (~1%) while the accuracy among samples in different solvents will be limited by the accuracy of the refractive index correction term.

Results and Discussion

Figure 1B:
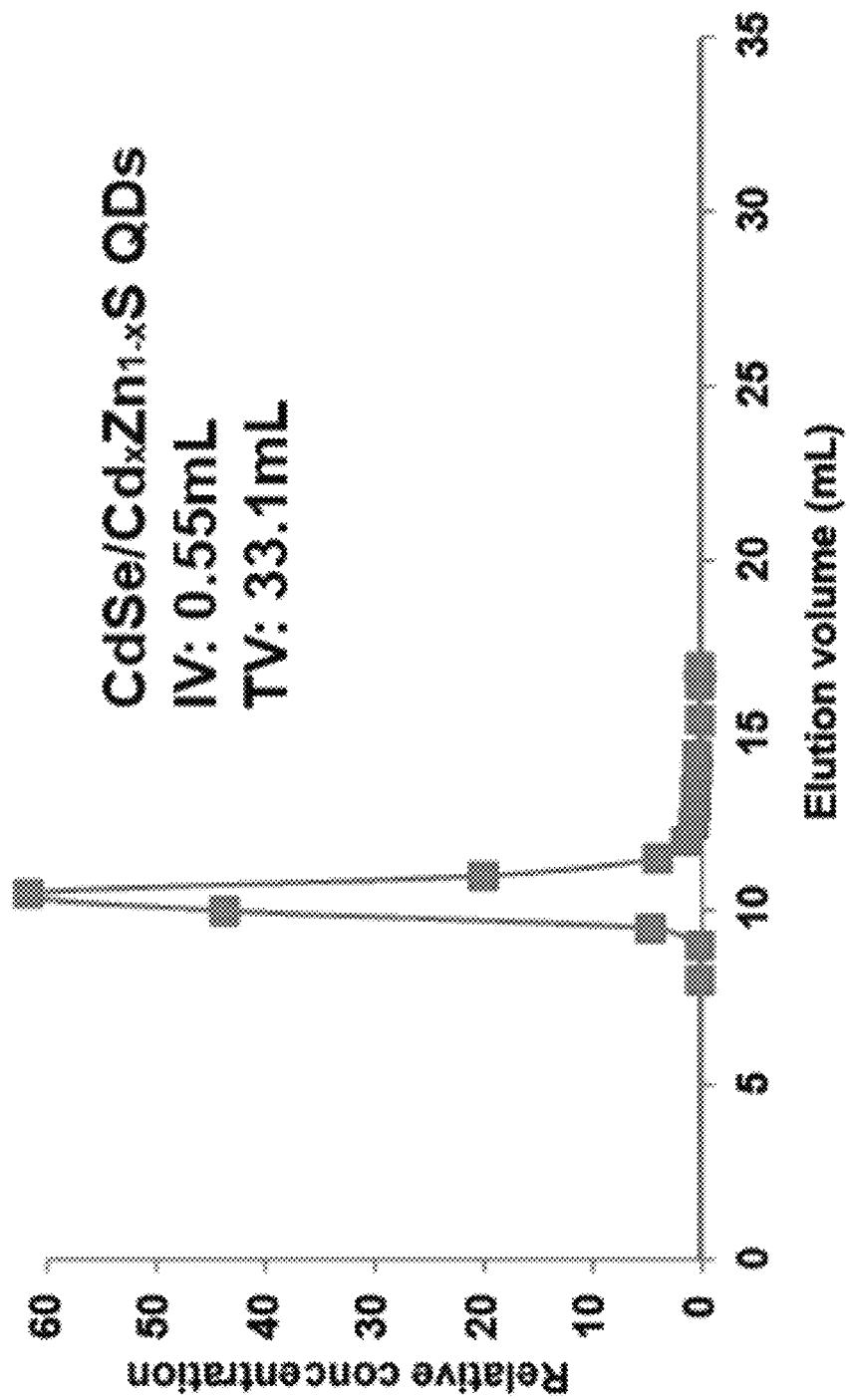
Figure 1C:
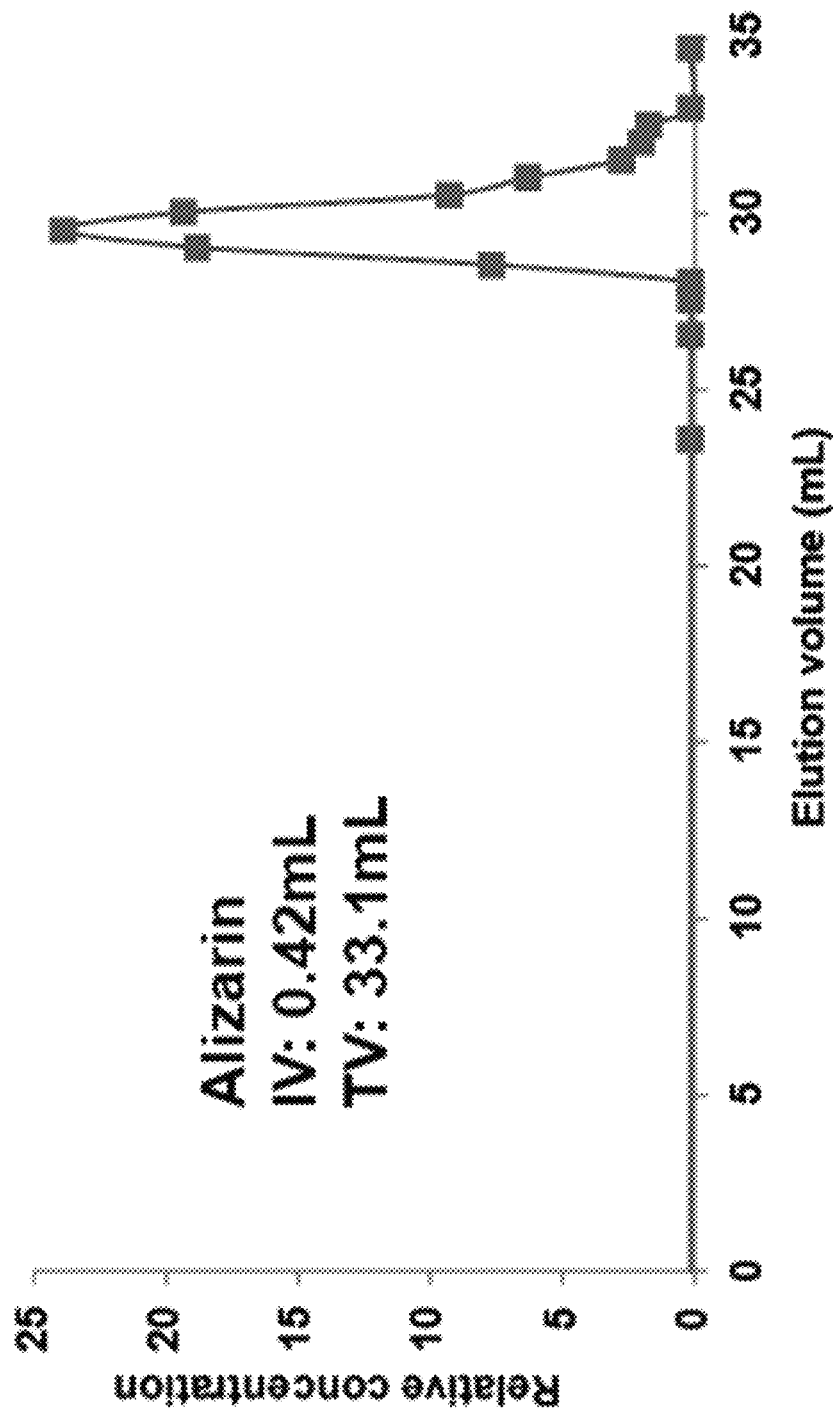

Feasibility of QDs Purification by GPC. A polystyrene gel medium was used to study the purification of hydrophobically-capped QDs. Because ligands bound to the surface of colloidal particles are potentially subject to reversible exchange with soluble forms of the ligand in the surrounding solution phase, it is not obvious based on prior art that the method of gel permeation chromatography of colloidal nanocrystals in which a pure solvent is used as the eluent could lead to substantial reduction of impurities and excess ligands while retaining the ability to recover a large fraction of the nanocrystal sample as a stable colloidal solution. Additionally, according to studies of GPC in the polymer area, strong ionic interactions with the stationary phase tend to prevent metal containing polymers from successfully traveling through the column. Therefore, before attempting to purify the QDs by GPC, it was first tested whether the QDs would irreversibly adsorb in the column due to particle-particle or particle-column interaction. The QD samples we used to test the efficacy of the column were CdSe1 and CdSe/CdZnS1 as described in the Experimental Section. Due to the difficulty in visualizing the concentration of impurities and excess ligands separated from the QDs solution, the dye alizarin was initially chosen to represent "small" molecules and we compared its chromatogram to that of the QDs. As shown in FIG. 1, the QDs exit the column when the elution volume equals approximately ⅓ of the total volume of the column (the expected void volume). Because the molecular weight operating range of the Bio-beads SX-1 GPC medium is described by the manufacturer as 600 to 14000 and both CdSe QDs and CdSe/Cd$_x$Zn$_{1-x}$S QDs are larger than that, the QDs do not spend any time in the pores and elute quickly from the column. However, small molecules (such as impurities, excess ligands or alizarin) should enter the pores more easily, which is expected to increase their retention time relative to that of the QDs. Alizarin was eluted at a volume close to the total volume of the column, thus indicating highly precise resolution from the QD samples.

The yield of the GPC column purification is always around 100% (CdSe1 QDs, 100.2%; CdSe/CdZnS1 QDs, 98.3%; alizarin, 101.4%), which avoids sample loss associated with biphasic or PR purification processes. Additionally, the QDs elute in a tight band (95% of the QDs sample flows out in 2 mL), which maintains the high concentration of the QDs solution and improves the column separation resolution against the later eluting impurities and excess ligands. After being rinsed with toluene following each purification process, the column can be used more than 10 times and provide very comparable purification results.

Figure 2A:
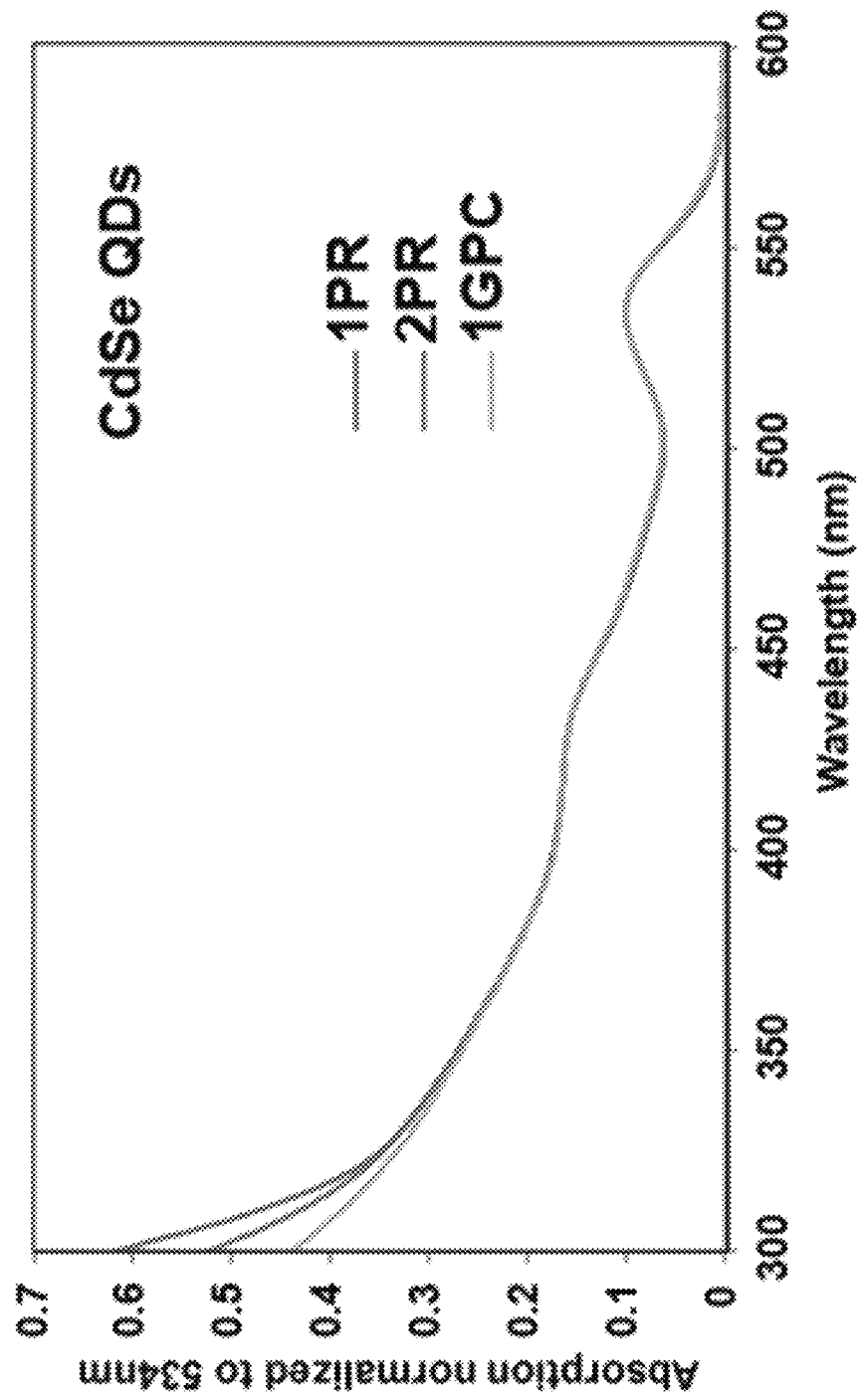
FIGS. 2A-2C show the stability verification of core and core/shell QDs purified by GPC based on absorption spectra, according to Example 1, with FIG. 2A showing the absorption spectra of CdSe1 (normalized to the $1^{st}$ absorption peak at ~534 nm) purified by 1PR, 2PR, and 1GPC.
Figure 2B:
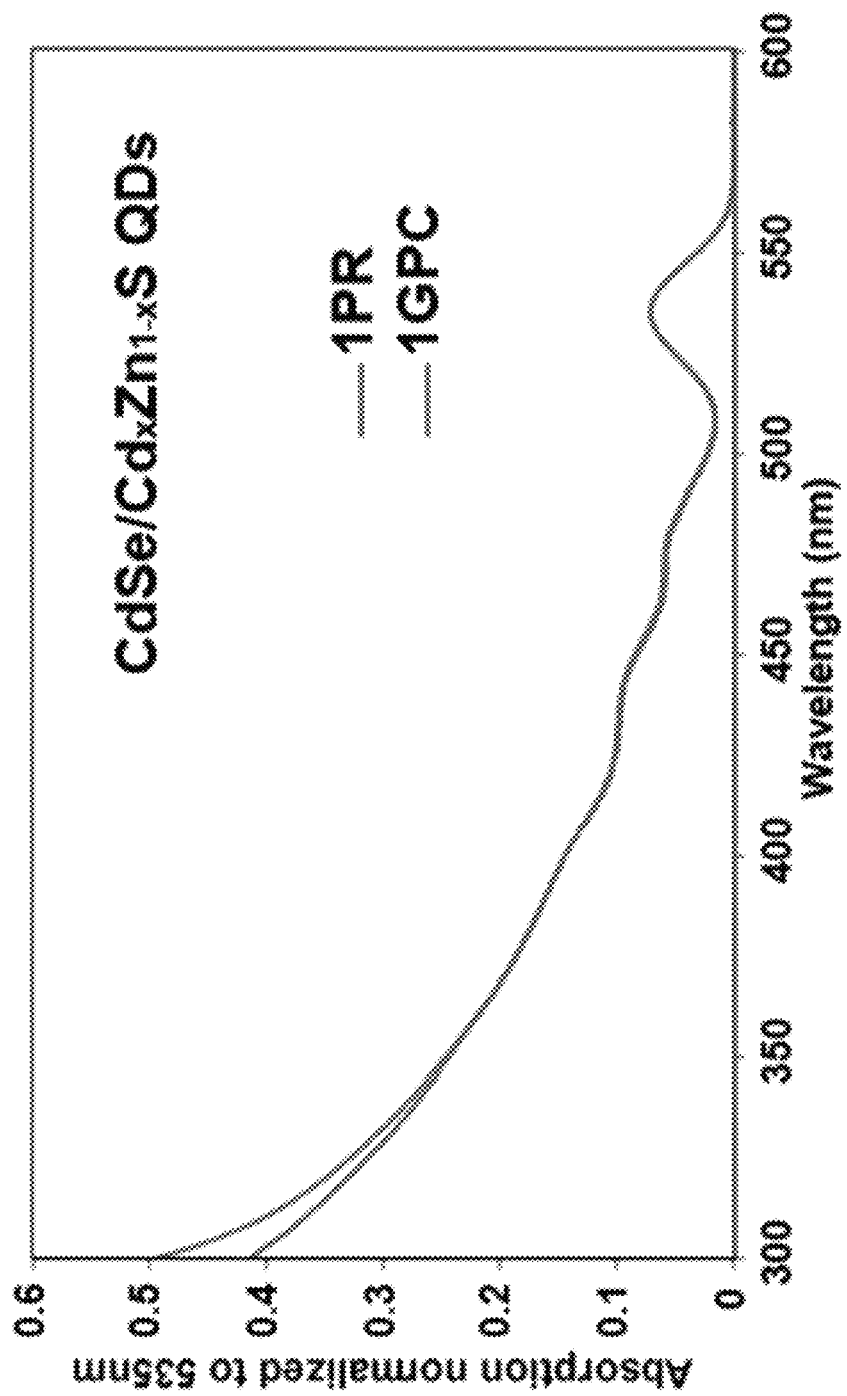

The stability of the QDs after GPC purification was also tested. According to absorption spectra shown in FIGS. 2A and 2B, both CdSe QDs and CdSe/Cd$_x$Zn$_{1-x}$S QDs maintain their absorption features after the GPC purification (there is a decrease in relative absorbance in the UV range, which may be associated with the absorption spectrum of impurities prior to purification). Since the absorption of the QDs is determined by their size and size distribution, this confirms that QDs do not aggregate or etch during the GPC purification process. At room temperature the 1GPC CdSe QDs are stable for more than 2 weeks when stored in toluene on the bench (we only continuously measured the absorption spectrum for 2 weeks, the actual lifetime of the CdSe QDs may be much longer than this), while the CdSe/Cd$_x$Zn$_{1-x}$S QDs began to slowly precipitate out from the solution after 1 day.

Figure 2C:
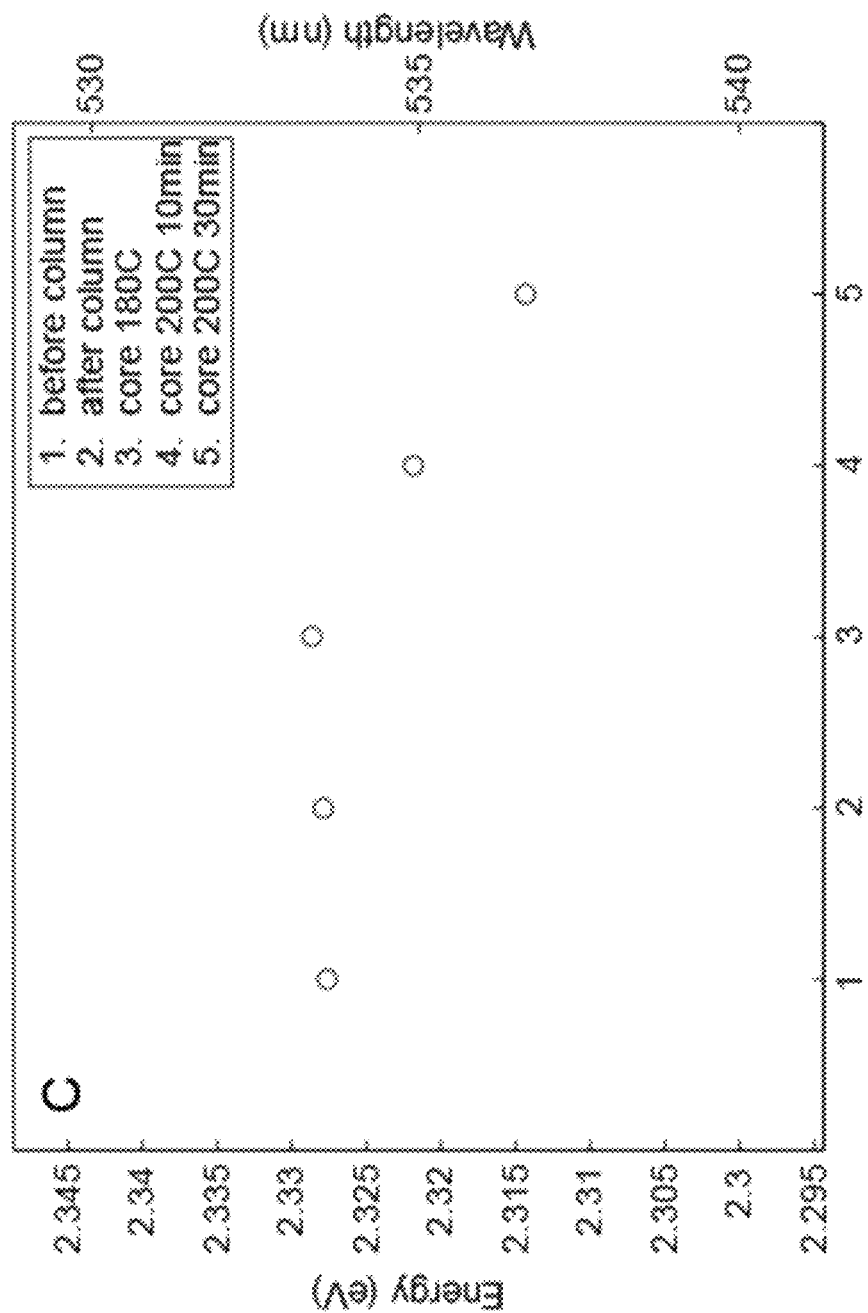

At high temperature, the CdSe1_1GPC sample demonstrated even better stability than 2PR samples. In particular, purified samples were injected to a simulated shell growth solvent of 1:2 oleylamine:ODE (v/v, 9 mL total) and heated up to high temperature. As shown in FIG. 2C, the first absorption peak position is almost fixed (or blueshifted ~1 nm) when the temperature reaches 180° C., and then slowly redshifts after extended heating at 200° C. This phenomenon is unlike the relatively larger blueshift (around 3-4 nm) that is frequently observed in PR purified QDs under similar conditions, which might be explained by the etching of QDs' surface in the presence of excess ligands. The redshift observed in FIG. 2C upon extended heating may be a signature of Ostwald ripening.

Figure 3A:
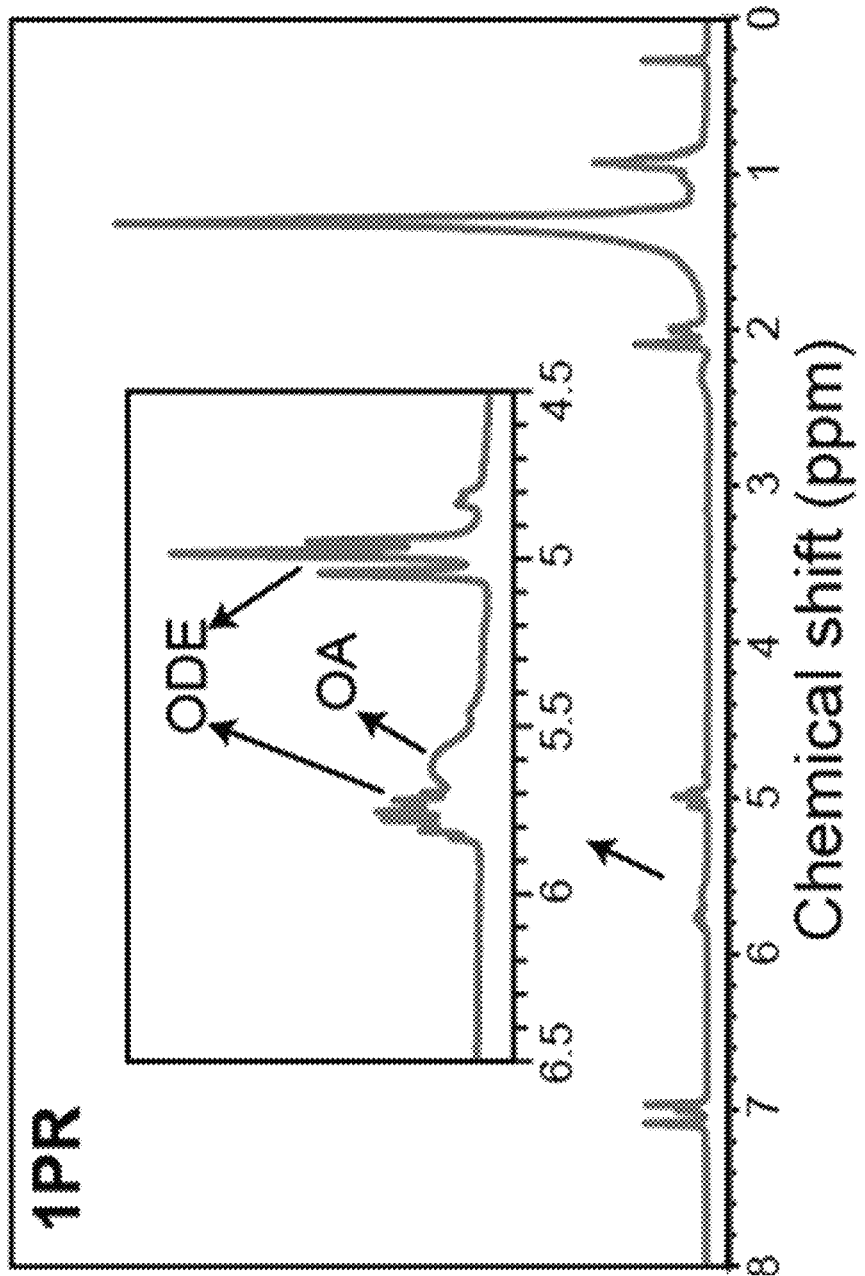
FIG. 3A shows qualitative $^1$H NMR spectra of the CdSe1 QD sample purified by 1PR, with the inset showing an expanded view of the spectra in the range 4.5-6.5 ppm for the olefin protons of OA and ODE, according to Example 1.
Figure 3B:
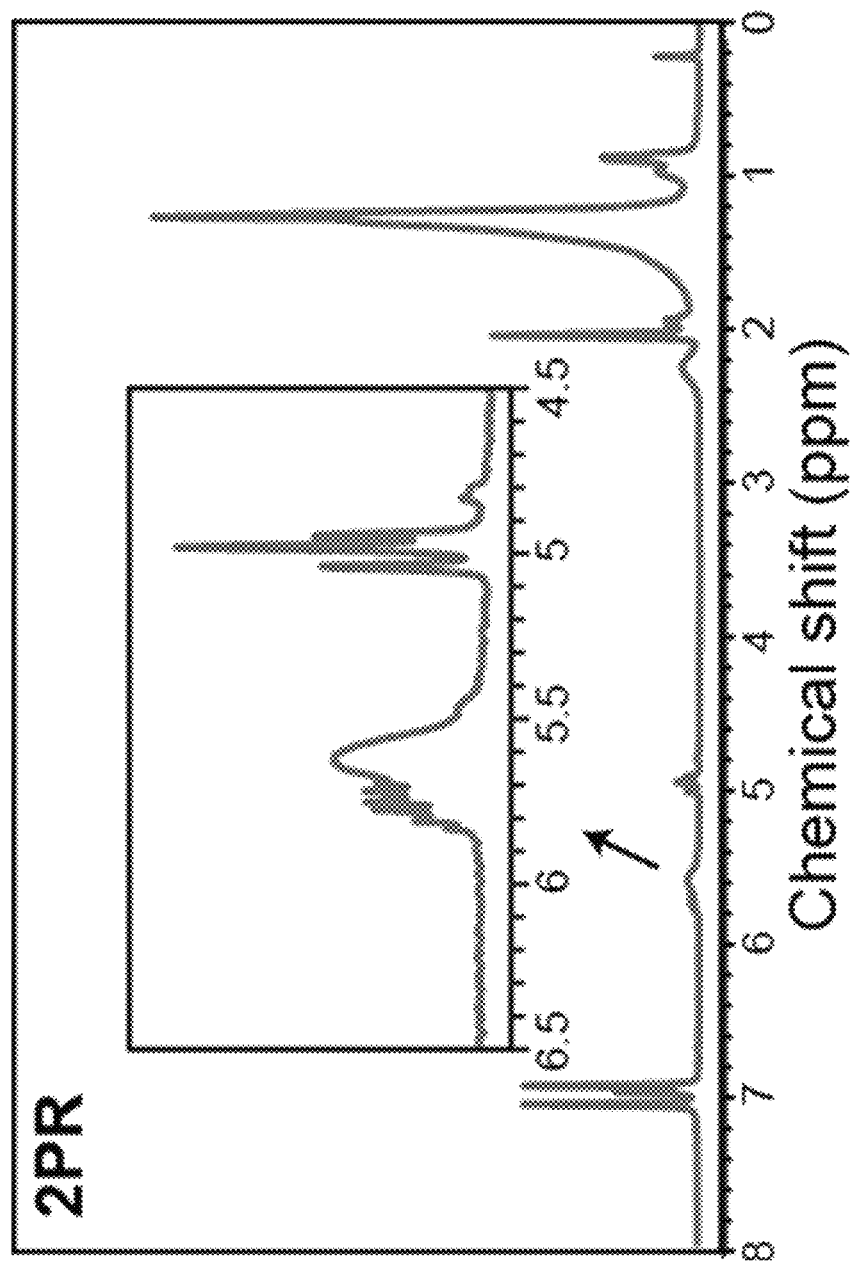
FIG. 3B shows qualitative $^1$H NMR spectra of the CdSe1 QD sample purified by 2PR, with the inset showing an expanded view of the spectra in the range 4.5-6.5 ppm for the olefin protons of OA and ODE, according to Example 1.
Figure 3C:
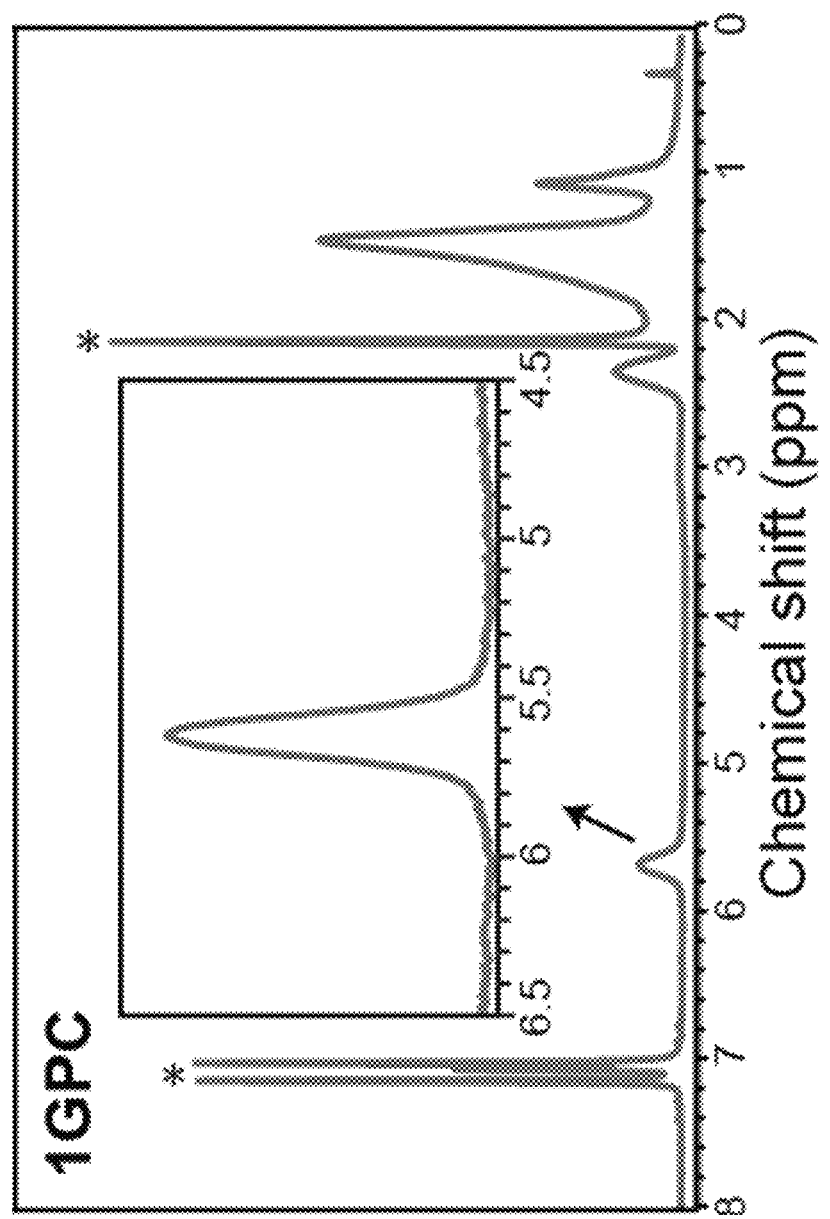
FIG. 3C shows qualitative $^1$H NMR spectra of the CdSe1 QD sample purified by 1GPC, with the inset showing an expanded view of the spectra in the range 4.5-6.5 ppm for the olefin protons of OA and ODE, according to Example 1. The asterisks indicate peaks associated with the toluene solvent that are present in each sample.

Analysis of the GPC Purified QDs: CdSe samples. The GPC purified CdSe1 QDs samples were characterized by $^1$H NMR to measure the amount of organic solvents and ligands that remain. The 1PR and 2PR samples are also characterized for comparison. Both ODE and oleic acid have resonances from their olefin protons with distinctive chemical shifts in the range of 5 ppm to 6 ppm, which makes them convenient as representative impurities and ligands whose presence and concentration can be determined by NMR. The $^1$H NMR results shown in FIG. 3 reveal two types of olefin features: sharp peaks characteristic of the molecules in free solution, and a broadened peak that we associate with molecules bound to (or in dynamic exchange with) the QD surface. The spectrum in FIG. 3A indicates that the 1PR sample still had a significant amount of ODE. After one additional PR purification, the amount of ODE is shown to have been reduced but not completely removed. The 1 GPC sample, on the other hand, shows a clean spectrum with only a broadened (~50 Hz) olefin resonance in the 5 ppm to 6 ppm range. This resonance is attributed to oleate species that are strongly interacting with the QD surface; in what follows the use of "OA" refers to oleate-based constituents of all types.

Figure 3D:
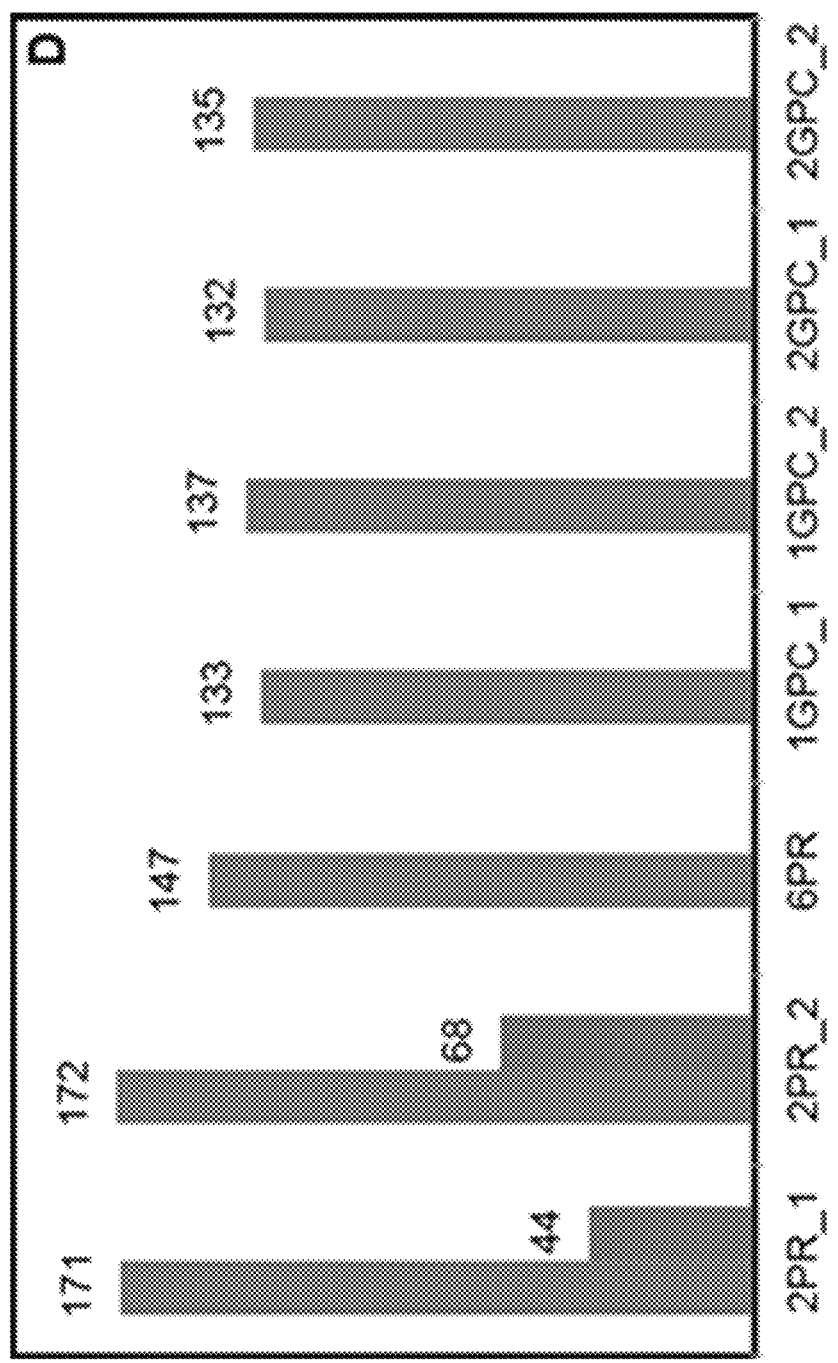
FIG. 3D shows the ligand/impurities-to-QDs mole ratio for CdSe1 QDs purified by different methods, according to Example 1, in which the ratio is calculated based on the quantitative $^1$H NMR and UV-Vis spectra.

In order to have a better understanding of the ligand/QD ratio for samples with different purification processes, THF was used as an internal standard in subsequent quantitative $^1$H NMR measurements. The total concentration of the ligands can be calculated based on the $^1$H NMR peak integrals; dividing by the QD concentration, as determined by the absorption spectrum, gives the ligand/QD ratio in each sample. Taking into account the uncertainty associated with the integration of the NMR peaks, average ligand/QD ratios were specified with a precision of ±5 ligands per QD (any inaccuracy in the molar extinction coefficient of the QD batch would affect all samples by a constant factor). The 2PR sample had an average 172 OA and 56 ODE per QD, while the 1GPC sample had only 135 OA on the QD surface. No sharp peaks were observed in the $^1$H NMR spectrum at the olefin region of OA, which suggests that there was no free OA in either system. Consequently, the ligand density difference is more likely due to weakly bound OA or OA-bearing impurities (i.e. $Cd(oleate)_2$ or $Cd_xSe_y(oleate)_z$). The ligand density was measured for a sequential 6PR sample, which shows a comparable, but still larger result than the 1GPC sample (147 OA per QD). As shown in FIG. 3D, GPC was used to purify the same QDs sample twice, which yields a similar ligand density on the QDs. For the 2GPC samples, the extra column purification did not decrease the ligand density on the QDs' surface, which suggests that all the weakly adsorbed ligands can be effectively removed during 1GPC process. $^{31}$P NMR spectra were also measured to confirm the complete removal of phosphorus containing species (i.e. TOPSe, TOP, TOPO appearing as byproducts of QD synthesis) by GPC. Excess ODE and OA species could be detected by $^1$H NMR in GPC solvent fractions eluted at later times. To test the dependence of the GPC purification technique on the initial sample concentration, a series of three aliquots of the same CdSe QD sample with different initial concentrations (58 μM, 115 μM and 175 μM) were purified by GPC, and it was observed <1% variation in the number of ligands/QD in the eluted products.

These results demonstrate that GPC purification is an efficient method to isolate QDs with reproducible ligand ratios. Because GPC operates on the basis of the hydrodynamic size difference and not polarity or a specific affinity interaction, the (entropic) driving force that contributes to the separation is fixed, and highly reproducible results can be obtained from this purification method. The fact that the samples prepared by multiple PR cycles contained larger numbers of ligands raised the question of whether the "excess" OA ligands in such samples represented higher surface coverage, or the presence of soluble OA-containing species.

Figure 4A:
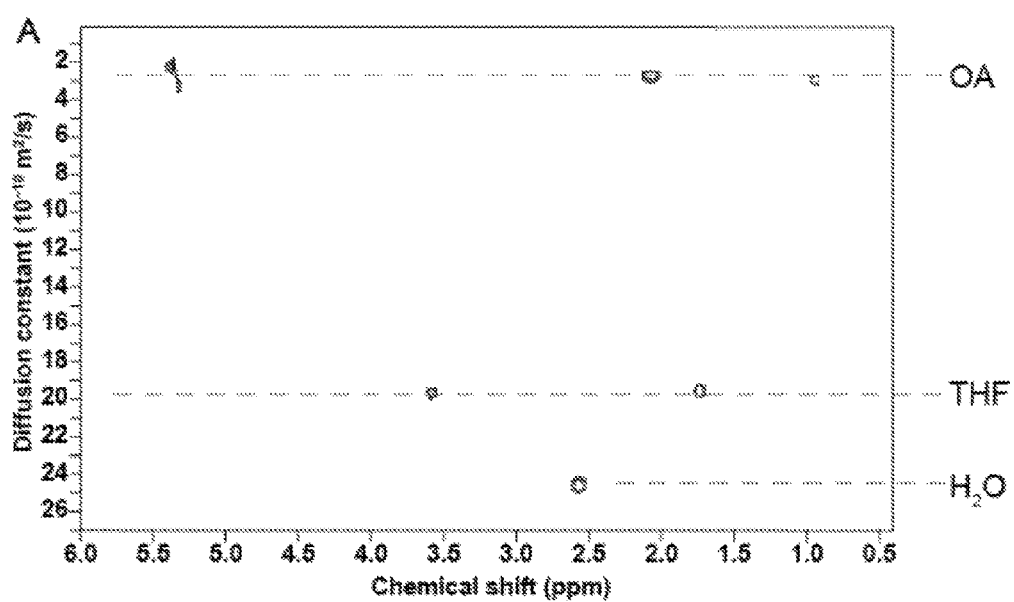
FIG. 4A shows diffusion-ordered NMR (DOSY) spectra of CdSe1_1GPC QDs in THF-$d_8$. The measurements were done with 100 ms diffusion delay and 2 ms diffusion gradient length.
Figure 4B:
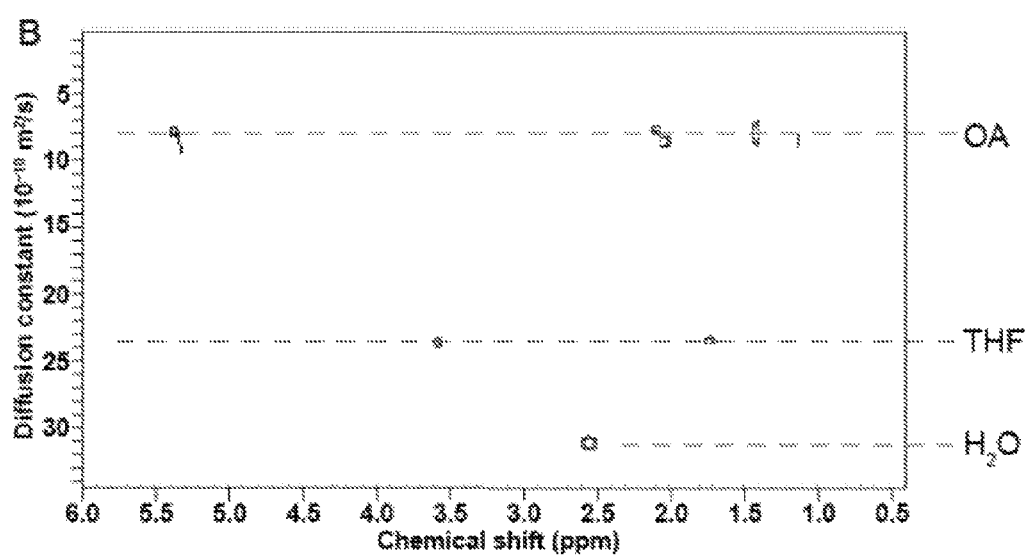
FIG. 4B shows DOSY spectra of CdSe1_2PR QDs in THF-$d_8$. The measurements were done with 100 ms diffusion delay and 2 ms diffusion gradient length.

Diffusion ordered NMR spectroscopy (DOSY) can be used to characterize the association of molecules with nanoparticles and was used here to determine the extent to which oleate in each sample is associated with the QDs' surface. Here, relative diffusion constants were used to measure the hydrodynamic radius to accommodate some run to run instrument variability in the absolute diffusion constant measurements. In order to obtain the characteristic diffusion constant for OA, we relied upon the olefin peaks because their chemical shift is well separated from those of THF protons. Based on the measured diffusion coefficients of the OA and THF in each run (shown in FIG. 4), the characteristic hydrodynamic diameter ($D_H$) of the OA in different samples can be calculated using the Stokes-Einstein equation by assuming the $D_H$ of THF is fixed at 0.63 nm (as reported by Dyadin et al.). The average $D_H$ of the OA from the CdSe1_1GPC sample was 4.42 nm, which is very close to the core diameter (3.5 nm) and an OA shell with thickness of 1~2 nm. However, the average $D_H$ of the 2PR sample was 1.85 nm, which suggests an average among OA bound to the QD surface and faster diffusing OA associated with small molecule impurities. If we assume all the OA from the CdSe1_1GPC QD sample is bound to the surface and consider molecular oleic acid as representative of the unbound oleate species in QD samples ($D_H$=0.88 nm), then 66% of the OA in CdSe1_2PR sample were attached to the QD surface, while 34% remained unbound.

Figure 5:
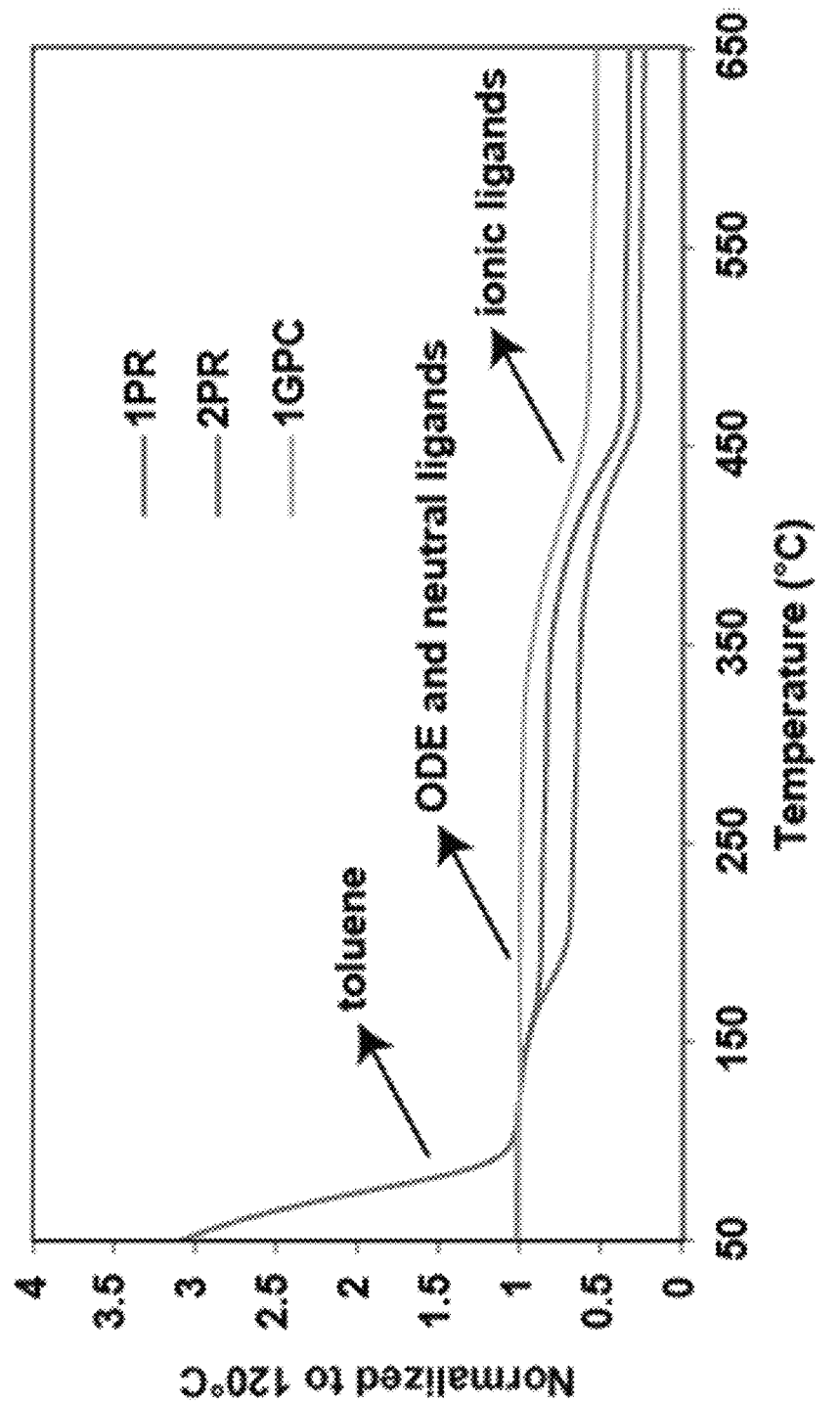
FIG. 5 shows the thermogravimetric analysis (TGA) curves of CdSe1 QDs purified by different methods with the arrows indicating regions assigned to the loss of the specified solvent or ligand.

The 1PR, 2PR and 1GPC CdSe1 QDs samples were also characterized by TGA to corroborate the NMR results of ligand/QDs ratio differences from the different purification processes. As FIG. 5 shows, the TGA curves can be separated into 3 regions. Below 120° C., mass loss primarily signifies the evaporation of the solvent (toluene); between 120° C. and 300° C., mass loss is attributed to the disappearance of neutral molecules; between 300° C. and 500° C., the ionically bonded ligands break down. It is assumed the remaining mass after heating to 500° C. was attributed to the inorganic core. As listed in Table 1, the CdSe1_1GPC sample did not show any significant weight difference until the temperature reached 300° C.; while both CdSe1_1PR and CdSe1_2PR QDs demonstrated neutral molecule removal over 120-300° C., which is in agreement with the NMR results. Based on the observed mass losses, the ionic-ligands/QDs mass ratio of CdSe1_2PR sample was 1.35, whereas CdSe1_1GPC sample was only 0.73. This difference can be explained by previously mentioned possible impurities in the 2PR sample, such as $Cd(oleate)_2$ or $Cd_xSe_y(oleate)_z$. The mass loss from 120-500° C. can be attributed to the removal of all the organic molecules from the system (except for the solvent) and the organic/inorganic ratios of CdSe1_2PR and CdSe1_1GPC samples were 1.83 and 0.78 respectively.

TABLE 1

Summary of the mass remaining at different temperatures from TGA trace[a]

| CdSe1 QD samples | | 1PR | 2PR | 1GPC |
|---|---|---|---|---|
| Mass remaining at different temperatures | 120° C. | 1.000 | 1.000 | 1.000 |
| | 300° C.[b] | 0.644 | 0.832 | 0.975 |
| | 500° C.[c] | 0.256 | 0.354 | 0.562 |

[a] Results are normalized to the mass at 120° C., at which point the solvent (toluene) is presumed to have been removed.
[b] Weakly binding ligands are removed before 300° C.
[c] Ionically binding ligands are presumed to disappear in the region of 300-500° C.

According to the absorption spectrum of CdSe QDs before and after the GPC purification, the size and size distribution of the samples did not change. However, there is a possibility that there could be some Cd and/or Se containing impurities remaining in the 2PR sample that are removed by GPC purification. In order to understand how the more stringent removal of impurities by GPC altered the Cd/Se ratios in the samples, the inorganic core portions of the CdSe1_2PR and CdSe1_1GPC were characterized by ICP MS. The Cd/Se ratio is similar between the two samples, but the 2PR sample has a slight, but statistically significant, increase in Cd that can be attributed to the residual Cd rich impurities (e.g. Cd(oleate)$_2$).

CdSe2 QDs, which were prepared with a different Cd/Se precursor ratio than CdSe1, were also characterized by $^1$H NMR and TGA. According to the $^1$H NMR spectrum, ODE can be almost completely removed in the CdSe2_2PR sample, which is different from what we observed for the CdSe1_2PR sample. This result illustrates that the PR purification process cannot provide repeatable results in different batches of QD samples. Based on the TGA result, similar to the CdSe1 samples, the CdSe2_1GPC sample has no mass loss in the region corresponding to the removal of neutral molecules, and a smaller mass loss in the ionically-bonded ligand breakdown region than does the CdSe2_2PR sample. This confirms that the GPC purification process gives consistent results among different types of CdSe QDs.

Analysis of the GPC Purified QDs: CdSe/Cd$_x$Zn$_{1-x}$S Core/Shell Samples. CdSe/Cd$_x$Zn$_{1-x}$S QDs were prepared by a SILAR process with CdSe QDs as the core and (TMS)$_2$S, Zn(oleate)$_2$ and Cd(oleate)$_2$ as the shell precursors. Since the shell generation process involves the highly reactive reagent (TMS)$_2$S and a more complicated reaction mixture than the synthesis of CdSe QDs, there are likely more impurities in the core/shell samples than in the core-only ones. Additionally, core/shell samples frequently encounter solubility problems after multiple PR cycles, and published ligand exchange procedures for core/shell QDs often describe only a single precipitation step. Therefore, it is imperative to find an alternative way to purify the core/shell QDs other than the PR method. In order to prove the efficacy of the GPC purification process, both 1PR and 1GPC CdSe/CdZnS2 QDs were characterized by $^1$H NMR and TGA.

Figure 6:
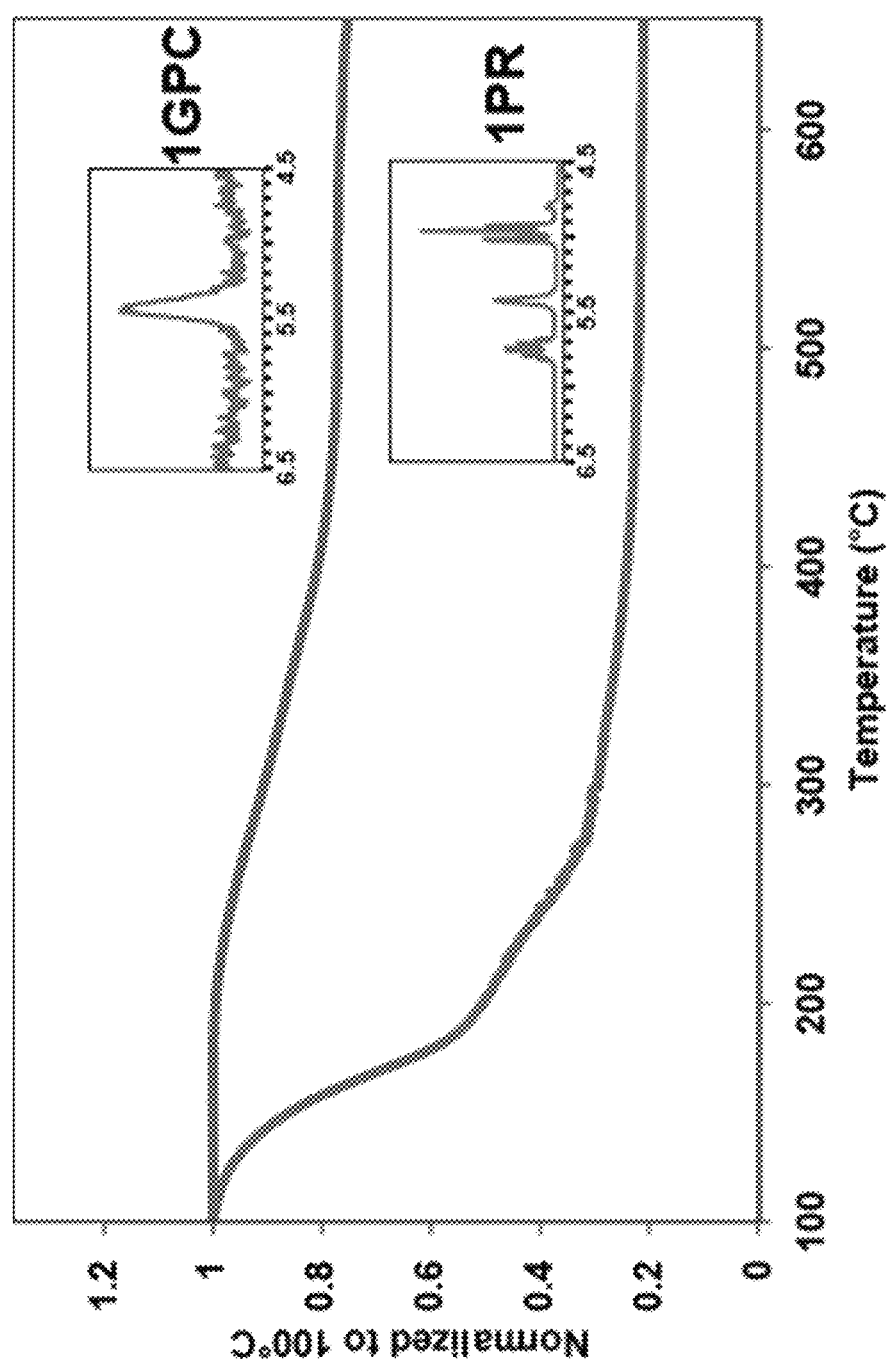
FIG. 6 shows the TGA curves of CdSe/CdZnS2 1PR (bottom line) and 1GPC (top line) QDs, normalized to 100° C., where the solvent (toluene) has been completely removed. The insets highlight the region of olefin protons from OA and ODE (4.5-6.5 ppm) in the $^1$H NMR spectra.

As shown in FIG. 6, the large difference in the organic/QD ratio between the two samples was confirmed by the TGA results. In the CdSe/CdZnS2_1PR sample, more than 72% of the mass was lost in the organic molecule breakdown region (from 100° C. to 500° C.), whereas the amount was less than 23% in the 1GPC sample. In the $^1$H NMR measurements, both OA and ODE can be observed in the spectrum of CdSe/CdZnS2_1PR sample, whereas the 1GPC sample displays a much cleaner spectrum with only OA appearing on the QD's surface. Therefore, GPC purification can also be used for CdSe/Cd$_x$Zn$_{1-x}$S QDs with high efficiency.

Further Surface Modification Studies. On the basis of the results presented above, GPC has been proven to be a highly effective method for the QDs purification. The achievement of an efficient method for the preparation of clean QD samples allows us to test whether impurities that reside in samples prepared by standard purification methods have a significant effect on further surface modification reactions. In the discussion shown below, a CdS shell growth titration experiment was performed on CdSe QDs, and cysteine ligand exchange on CdSe/Cd$_x$Zn$_{1-x}$S QDs to study the effect of excess ligands and impurities on the surface reactivity of QDs.

Figure 7A:
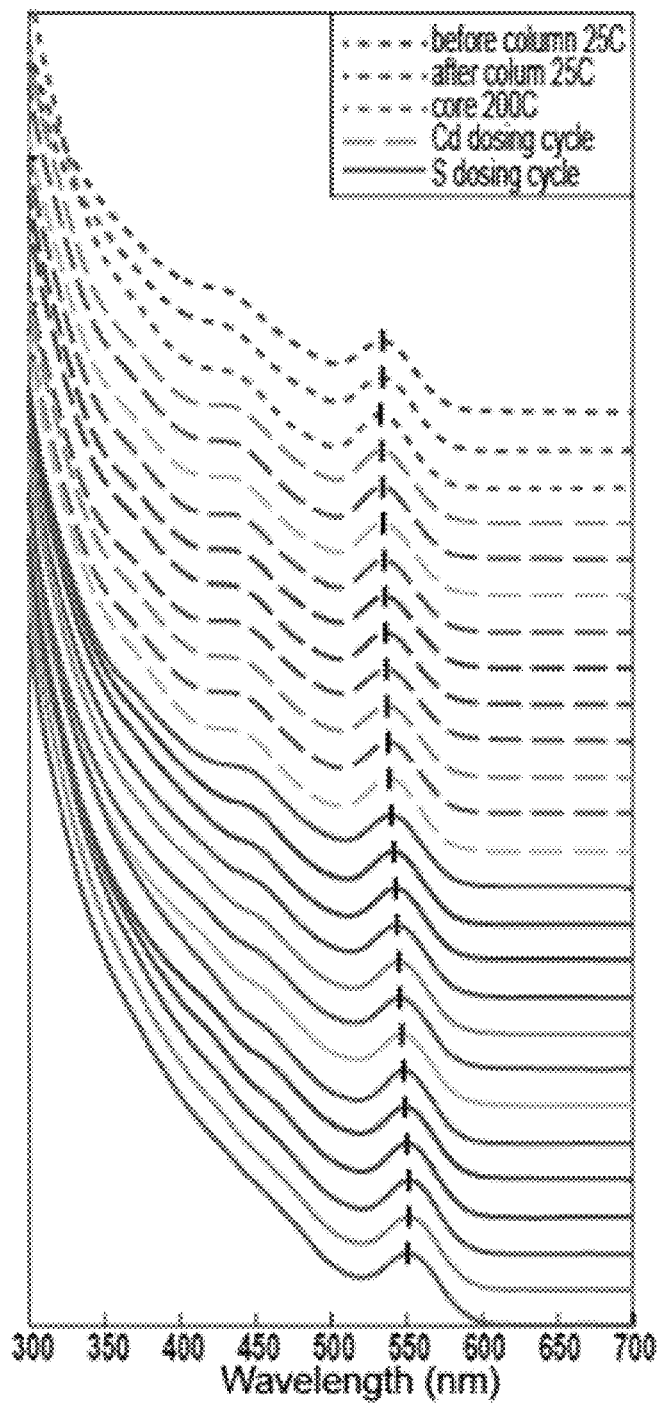
FIG. 7A shows the waterfall absorption spectra and the lowest energy extinction peak position shift of the aliquots taken during the CdS shell growth titration experiment on CdSe1 QDs purified by 1 GPC with Cd dosing first, according to Example 1.
Figure 7B:
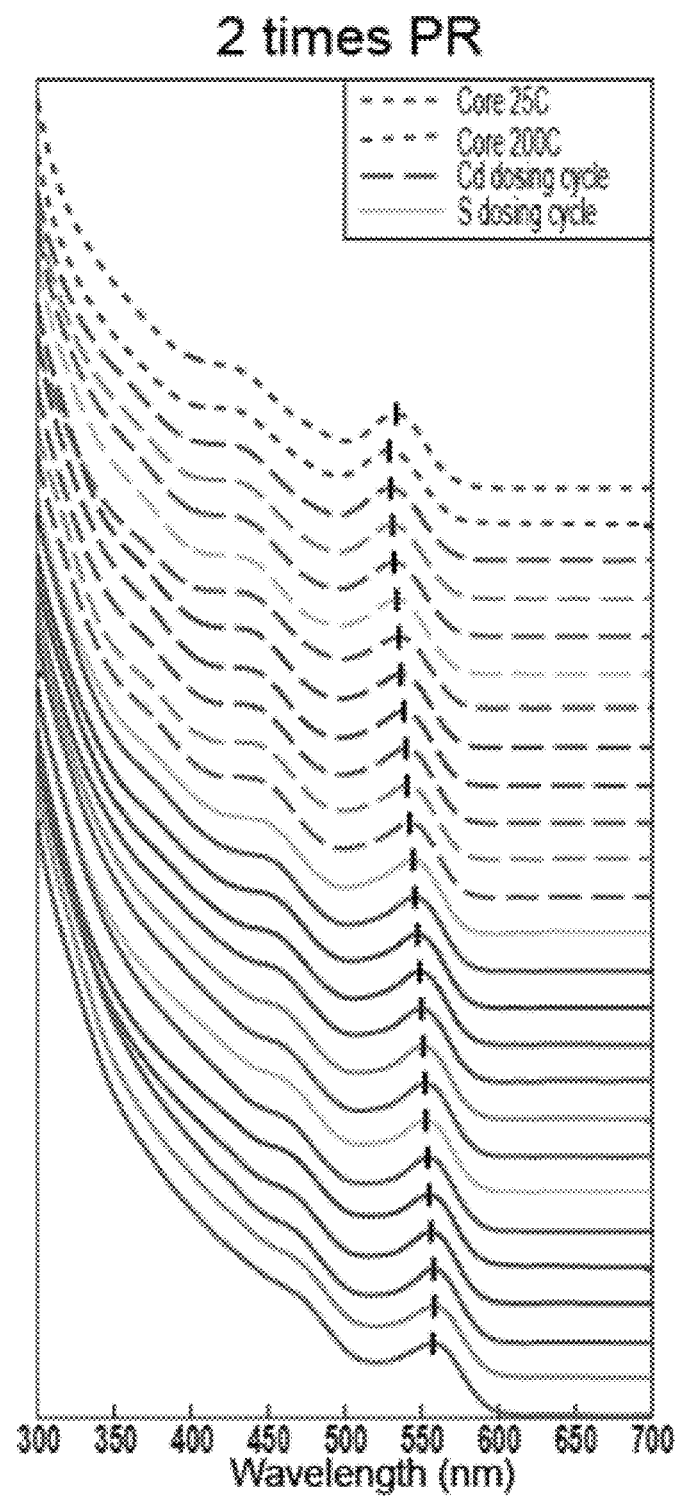
FIG. 7B shows the Waterfall absorption spectra and the lowest energy extinction peak position shift of the aliquots taken during the CdS shell growth titration experiment on CdSe1 QDs purified by 2PR with Cd dosing first, according to Example 1.
Figure 7C:
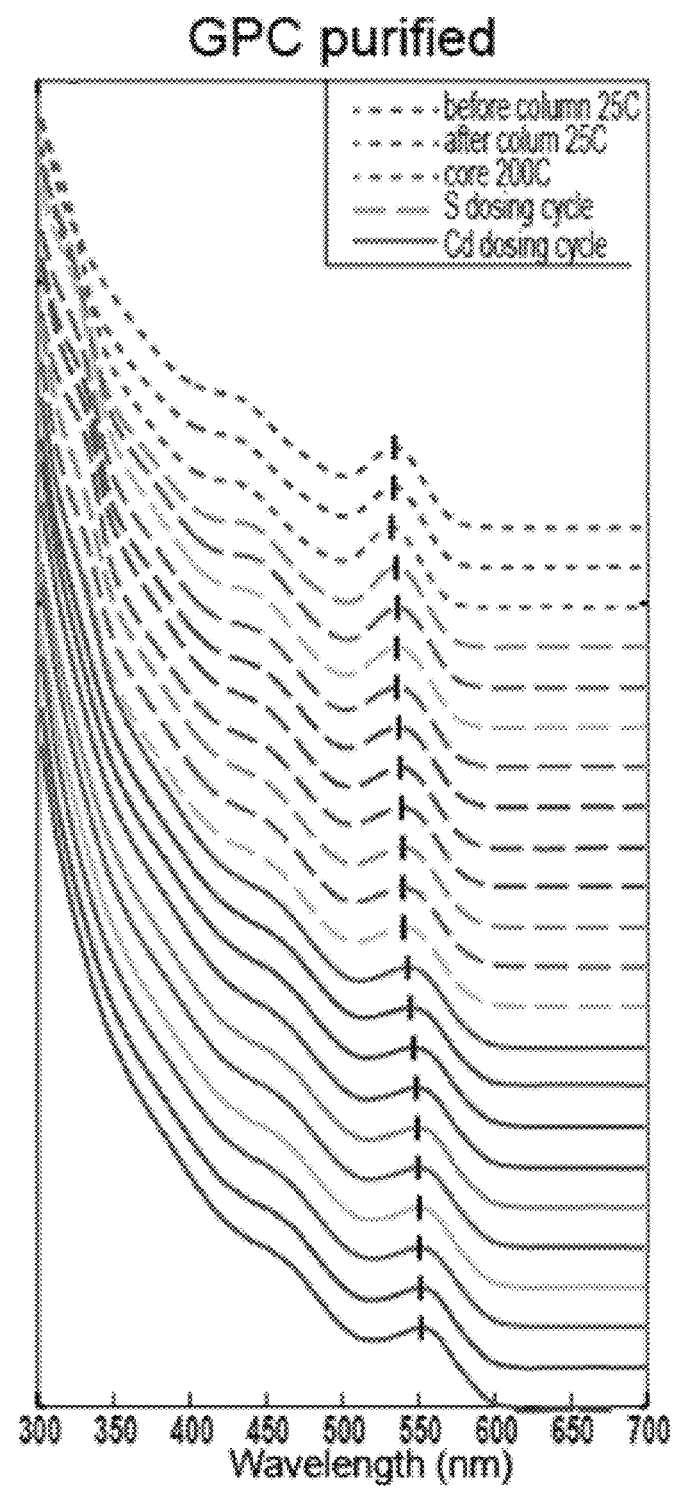
FIG. 7C shows the waterfall absorption spectra and the lowest energy extinction peak position shift of the aliquots taken during the CdS shell growth titration experiment on CdSe1 QDs purified by 1 GPC with S dosing first, according to Example 1.
Figure 7D:
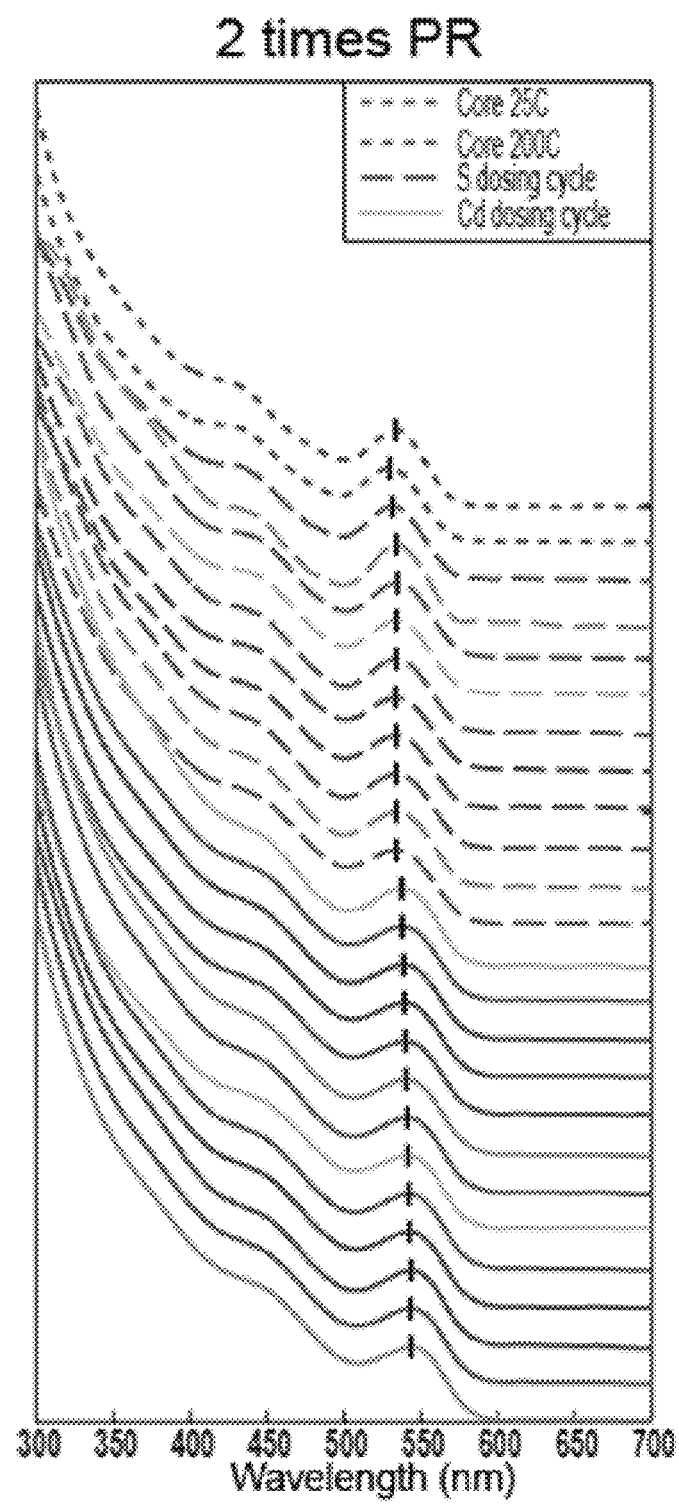
FIG. 7D shows the Waterfall absorption spectra and the lowest energy extinction peak position shift of the aliquots taken during the CdS shell growth titration experiment on CdSe1 QDs purified by 2PR with S dosing first, according to Example 1. In each of FIGS. 7A-7D, the interval between aliquots was 10 min.
Figure 7E:
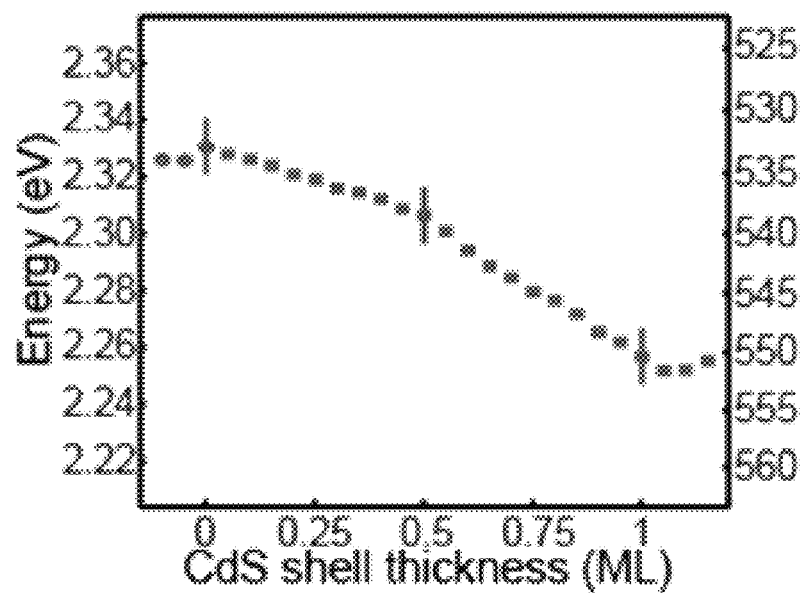
FIG. 7E shows plots of lowest energy exciton absorption as a function of targeted CdS shell thickness for 1GPC, Cd dosing first, according to Example 1.
Figure 7F:
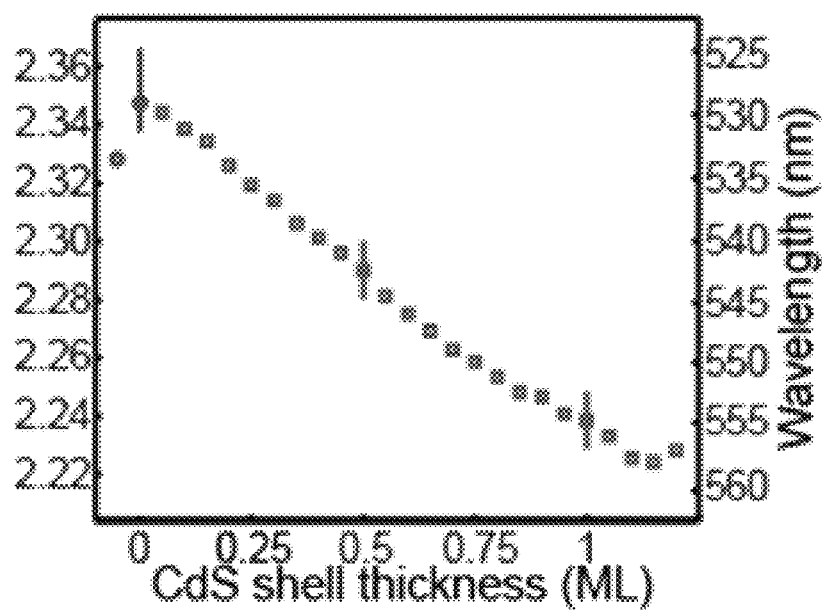
FIG. 7F shows plots of lowest energy exciton absorption as a function of targeted CdS shell thickness for 2PR, S dosing first, according to Example 1.
Figure 7G:
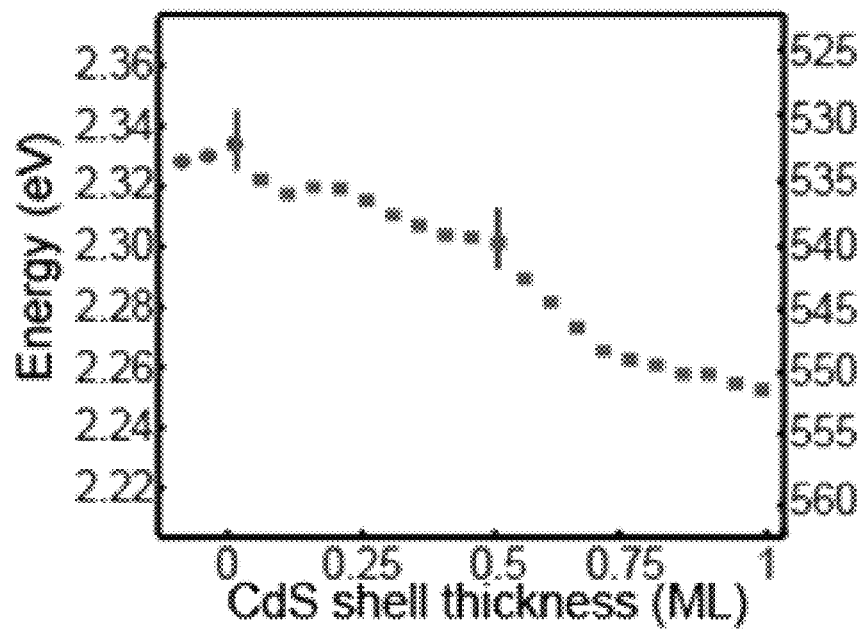
FIG. 7G shows plots of lowest energy exciton absorption as a function of targeted CdS shell thickness for 1GPC, S dosing first, according to Example 1.
Figure 7H:
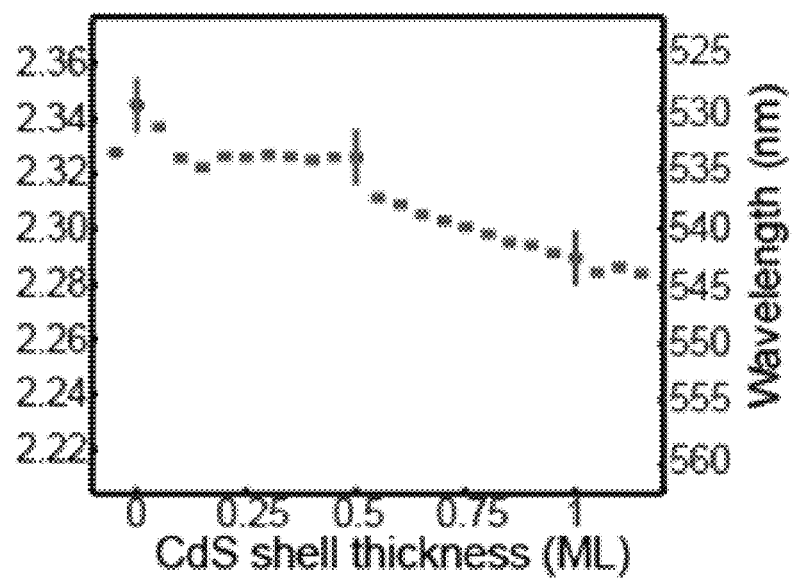
FIG. 7H shows plots of lowest energy exciton absorption as a function of targeted CdS shell thickness for 2PR, S dosing first, according to Example 1.
Figure 8A:
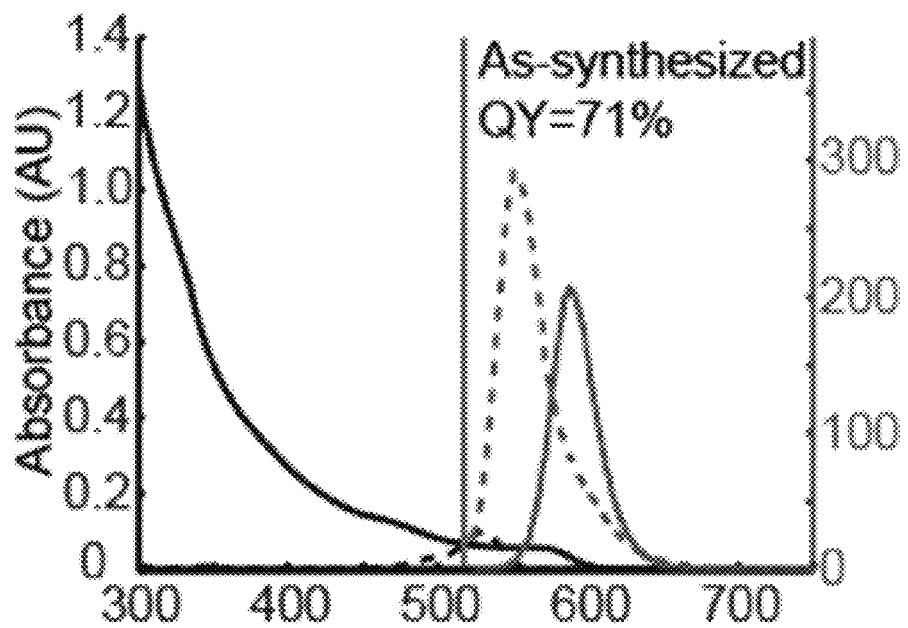
FIGS. 8A-8D show the photoluminescence quantum yield of CdSe/CdZnS2 QD samples in each step during the cysteine ligand exchange reaction, with FIG. 8A showing the as-synthesized sample, FIG. 8B showing the 1PR sample, FIG. 8C showing the 1GPC sample, and FIG. 8D showing the cysteine capped sample. The excitation wavelengths used for each measurement are marked by the vertical line. Absorption spectra (solid dark line) and emission spectra (solid lighter line) of QDs are shown as solid lines, while dashed lines indicate rhodamine 590 in ethanol.
Figure 8B:
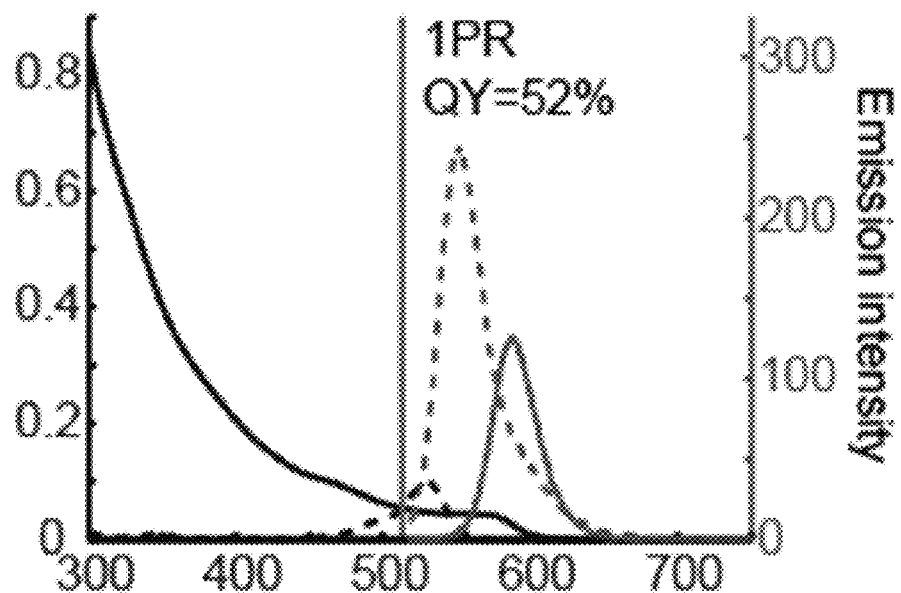
Figure 8C:
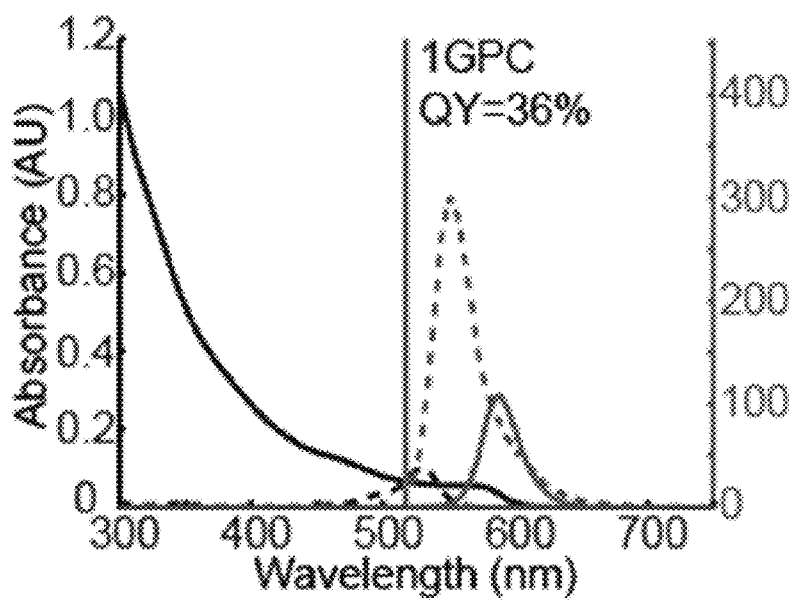
Figure 8D:
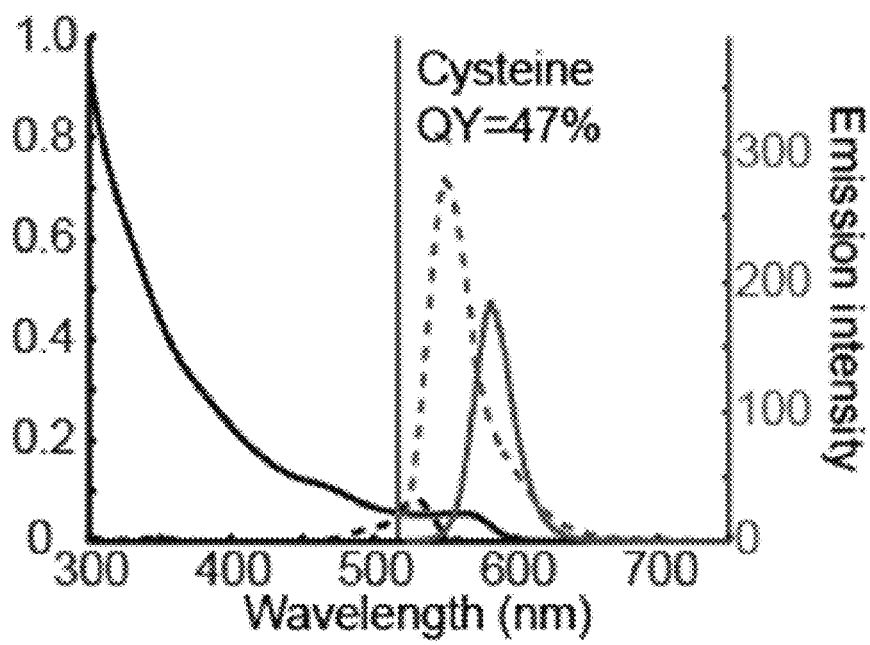

Titration of CdS Shell Growth on CdSe QDs. CdSe/CdS core/shell QDs are known for high QY and asymmetric charge separation. Some of the most widely practiced preparation procedures utilize the SILAR method to grow a CdS shell on the CdSe core. The shell growth process requires that initial organic ligands be displaced so that material can be added to the crystal surface; as a result, it was expected that shell growth could depend strongly on the surface environment, including the presence of excess ligands and/or impurities. Here, a set of titration experiments were employed to test whether the differences observed in analysis of GPC and PR purified QDs lead to different synthetic outcomes in the initial stages of core/shell growth by SILAR. A quantity of Cd and S precursors equivalent to 1.0 monolayer of CdS shell growth was added to CdSe1 core samples purified by GPC or by precipitations only. In FIG. 7A,B, 1.0 monolayer equivalent of Cd(oleate)$_2$ was added first, followed by 1.0 monolayer equivalent of (TMS)$_2$S. In FIG. 7C,D, the order of addition was reversed so that S was added first. In all cases, the additions were conducted stepwise in doses of 0.1 monolayer, and time was allowed following each step for the reaction to near completion prior to the withdrawal of a small aliquot for spectroscopic analysis. The progress of the shell growth is characterized based on the bathochromic shift of the absorption spectrum (FIG. 7F~H) and emission spectrum versus effective shell thickness applied.

As shown in FIG. 7, the 1GPC purified QDs experienced a lower rate of redshifting than did the 2PR purified sample when Cd was introduced first in the SILAR process. After the Cd cycle, both of these samples exhibited a similar growth rate in the S cycle. The smaller redshift was interpreted as an indication of a lower growth rate for Cd in the 1 GPC sample. Experiments in which the S precursor was added first also show a difference in the initial reactivity of 1GPC and 2PR samples. The 2PR sample (FIG. 7D) displayed little change in effective bandgap upon the addition of (TMS)$_2$S, suggesting little reaction with the QD surface given the large redshift associated with S addition following Cd (FIG. 7B). In the subsequent Cd dosing cycle, a relatively large redshift was observed in the first Cd injection followed by a continuous redshifting at a slower rate. In contrast, the 1 GPC sample (FIG. 7C) experienced a continuous redshift during the entire S dosing process followed by a large shift in the first four Cd injections and smaller shifts for the later ones. The FWHM of the emission peak was measured to characterize the size distribution during the titration process and is helpful in explaining the difference in reactivity towards added (TMS)$_2$S between the 1 GPC and 2PR samples. Compared to the results when Cd is introduced first, the size distribution increases significantly during the S dosing titration cycle, with a larger increase for the 1 GPC sample.

Without wishing to be bound by any particular theory, it is believed that the difference in reactivity of the initial QD surface towards the addition of Cd(oleate)$_2$ can be explained by the presence of a Cd-bearing impurity in the 2PR sample. For the 1GPC sample, once the Cd(oleate)$_2$ was introduced as the Cd precursor, part of it was diverted to saturate the solution instead of reacting on the QDs' surface. However, for the 2PR sample, due to the possible presence of Cd(oleate)$_2$ as an impurity and surface etching by the excess amount of weakly bonded oleic acid, the equilibrium solubility limit for Cd(oleate)$_2$ above the QD surface had already been reached. Hence, in the 2PR sample more of the added Cd(oleate)$_2$ could be used for the shell growth, which resulted in a faster growth rate and larger redshift than was observed in the 1GPC sample.

These observations suggest that etching and/or ripening processes are competing with shell growth when (TMS)$_2$S is added first in both the 1GPC and 2PR samples. Ligand exchange experiments have shown that TMS reagents can facilitate removal of oxyacid ligands through the formation of O-TMS byproducts. In the present case, the total amount of (TMS)$_2$S for 1.0 monolayer shell growth, 319 per QD, is much larger than the total OA ligand density on the QD surface in either sample. The relatively larger size distribution change observed on (TMS)$_2$S addition in the 1 GPC titrations could be an indication that effective removal of excess ligands and impurities decreases the colloidal stability of the QDs towards the addition of excess (TMS)$_2$S.

Based on these observations, impurities and/or excess ligands present in PR purified samples influence the reactivity of the CdSe QD surface towards the addition of shell precursors in both Cd-first and S-first cases. For both PR and GPC purified samples, initiating the SILAR process with Cd produced larger redshifts and better maintained the emission linewidth; this result is in keeping with much SILAR literature in which Cd is added first. Despite the slower initial redshift under Cd addition seen in the GPC purified sample, it is stressed that core/shell QDs have been obtained with good optical properties from these starting materials after multiple SILAR cycles. The availability of highly purified QD samples via GPC should allow the possible roles of various intrinsic and purposely-added minor constituents in shell growth reactions to be investigated more thoroughly in future work.

Cysteine Ligand Exchange Reaction of CdSe/Cd$_x$Zn$_{1-x}$S QDs. Ligand exchange reactions are essential to prepare water-soluble QDs with minimal hydrodynamic diameters; cysteine is a convenient monothiol ligand that presents a zwitterionic nanoparticle surface and has been shown to enable renal clearance of QDs. In order to achieve better ligand exchange efficiency, the amount of original ligands should be reduced as much as possible. Based on the $^1$H NMR and TGA results described above, the CdSe/CdZnS2_1GPC sample had a much smaller amount of OA than the CdSe/CdZnS2_1PR sample. The influence of this difference in purity was investigated on a biphasic (toluene/water) cysteine ligand exchange reaction.

Before mixing the aqueous and the organic solutions, both phases were clear in each of the two samples. After stirring the mixtures for 15 min, material began to precipitate in the aqueous phase of the 1PR sample and this appeared to impede the ligand exchange reaction. After 30 minutes, it was observed that the aqueous phase became colorful in the 1GPC sample; this change in solubility is evidence that the ligand exchange reaction is proceeding successfully. After 1 hour, almost all of the color had transferred in the 1GPC sample, while the 1PR sample still had not recovered. This result demonstrates that a clean surface of the original QDs aids in promoting a successful ligand exchange reaction, and that CdSe/Cd$_x$Zn$_{1-x}$S core/shell QDs with such a clean surface can be achieved by GPC. The cysteine capped 1GPC QDs were stored in a refrigerator and slowly precipitated out after 2 days (such limited stability is characteristic of cysteine-capped QDs). Thus, a successful cysteine ligand exchange with 1PR QDs was achieved, but due to the limited reproducibility of the PR purification method, the reaction rarely proceeded. In contrast, the GPC purified sample consistently showed efficient exchange with the new cysteine ligand and transfer to the aqueous phase.

The photoluminescence (PL) change of the QDs during the ligand exchange process was measured and is shown in FIG. 8. The QY of the as-synthesized CdSe/CdZnS2 QDs was 70.6%; after 1PR, the QY dropped to 52.2%; and after the GPC purification the QY decreased further to 35.7%. However, the cysteine ligand exchange process brought the QY back to 46.6%, which is suitable for applications of water-soluble QDs as fluorophores.

EXAMPLE 2

Organic phosphonate capped CdSe quantum dots (QDs): This example demonstrated the method in which GPC is used to isolate nanocrystal quantum dots composed of cadmium selenide with phosphonic acid-derived ligands (phosphonate ligands) from a mixture containing the same as well as trioctylphosphine oxide, trioctylphosphine, and excess phosphonate species, in a toluene solvent.

Preparation: Organic phosphonate capped QDs are synthesized by a reported procedure (Greytak, A. B.; Allen, P. M.; Liu, W.; Zhao, J.; Young, E. R.; Popović, Z.; Walker, B. J.; Nocera, D. G.; Bawendi, M. G. Chem. Sci. 2012, 3, 2028-2034.). The synthetic solvent was a mixture of 3 g trioctylphosphine oxide (TOPO) and 3 mL trioctylphosphine (TOP). The Cd precursor was prepared by heating 90 mg CdO and 430 mg tetradecylphophonic acid (TDPA) at 300° C. under nitrogen flow until the solution became colorless and clear. Afterward, the reaction mixture was cooled to 130° C. and vacuum was applied to remove evolved water. The mixture was heated back to 360° C. and a solution of TOPSe in TOP was injected quickly (2.2M). The flask was cooled down under a stream of air to room temperature.

Figure 9A:
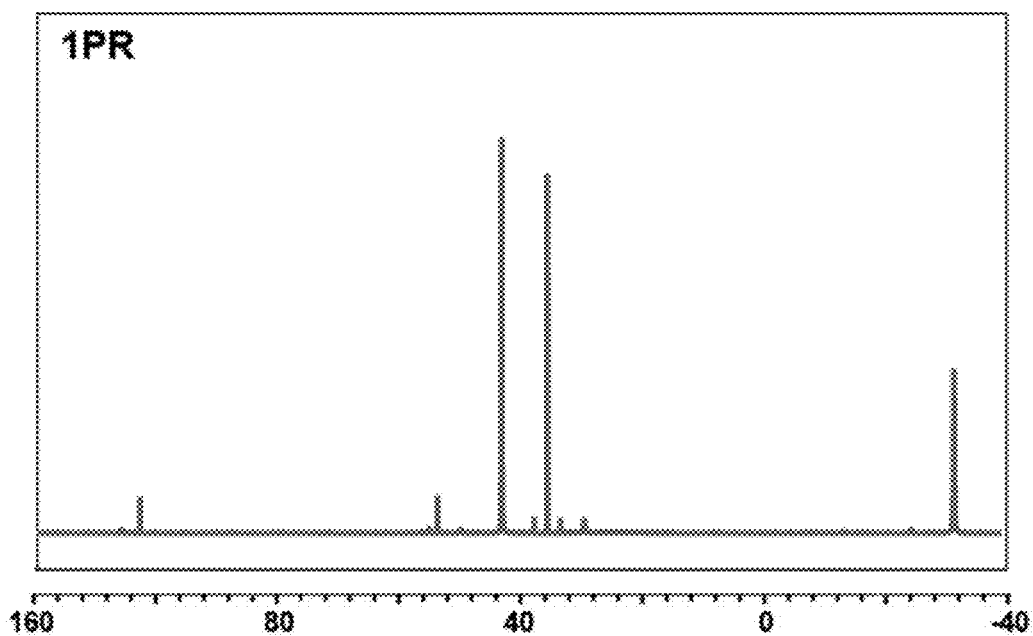
FIG. 9A shows $^{31}$P NMR of the phosphonate capped CdSe QDs after 1PR purification, according to Example 2.
Figure 9B:
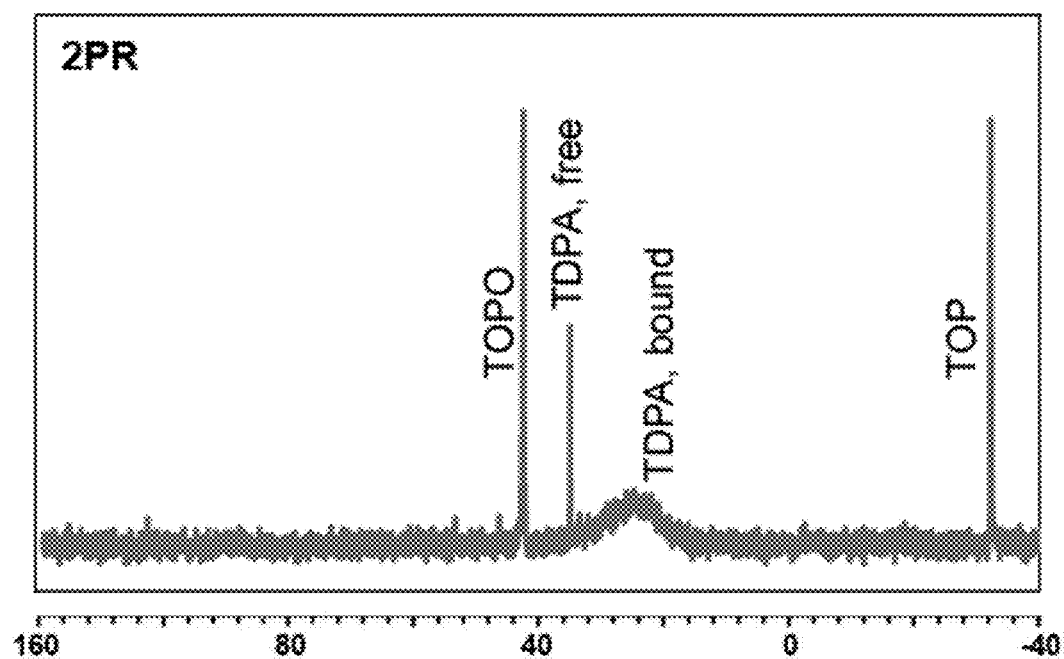
FIG. 9B shows $^{31}$P NMR of the phosphonate capped CdSe QDs after 2PR purification, according to Example 2.
Figure 9C:
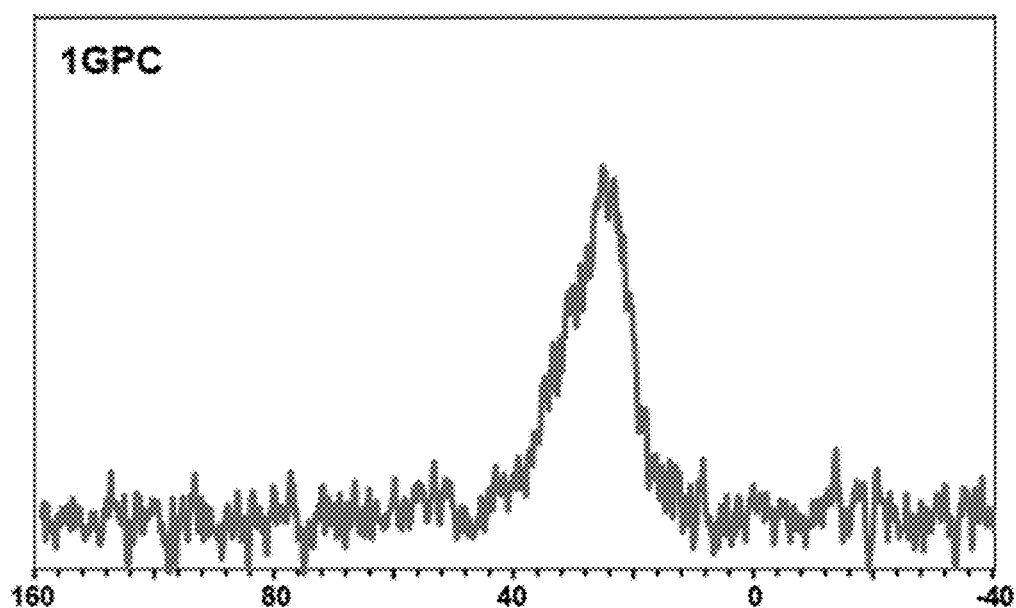
FIG. 9C shows $^{31}$P NMR of the phosphonate capped CdSe QDs after 1GPC purification, according to Example 2.

Purification result: The QDs purified by GPC showed only bound phosphonate ligands in the system (confirmed by 31P NMR, as shown in FIGS. 9A, 9B, and 9C), while the impurities remain in QDs solution purified by other purification including 1 time precipitation and 2 times precipitation.

EXAMPLE 3

CdSe/CdS nanoparticles with different shell thickness (thin: CdSe/CdS_1; thick: CdSe/CdS_2): This example demonstrated the method in which GPC is used to isolate nanocrystal quantum dots in which the surface is composed of cadmium sulfide. It also demonstrated the method in which nanoparticles of different size but with a similar surface composition can be isolated in solution by the exact same procedure. The ratio of surface ligands per nanoparticle in the purified product was found to increase with increasing nanoparticle size and surface area, demonstrating a method in which GPC is used to prepare a series of nanoparticle products with similar surface composition (for example, similar densities of ligand per unit surface area).

Figure 10A:
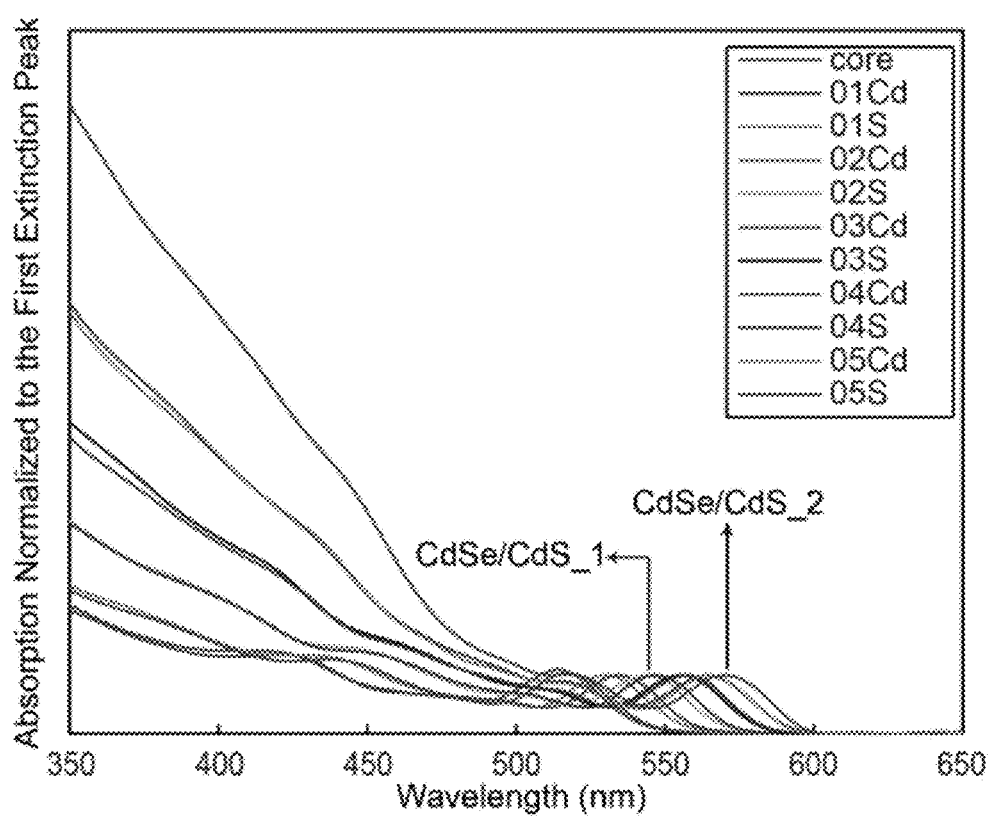
FIG. 10A shows the absorption spectrum of the CdS shell growth process, according to Example 3.
Figure 10B:
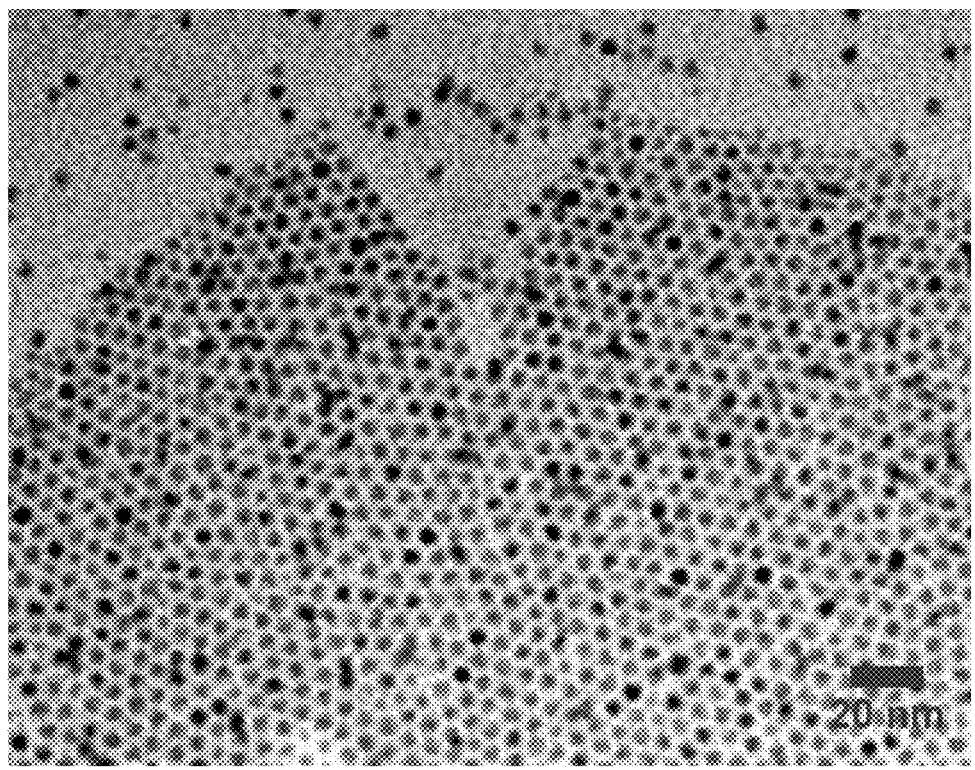
FIG. 10B shows a TEM image of the CdSe/CdS_2 QDs, according to Example 3.
Figure 11A:
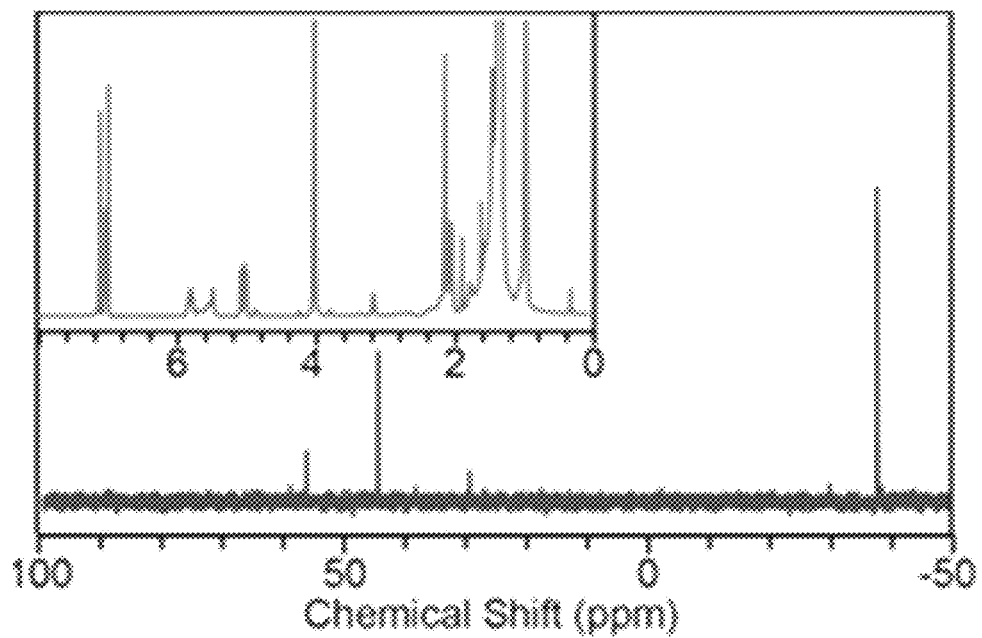
FIG. 11A shows $^{31}$P NMR spectra of the CdSe/CdS Nanoparticles, with $^1$H NMR spectra inset, of the CdSe/CdS_1 sample before the GPC purification according to Example 3.
Figure 11B:
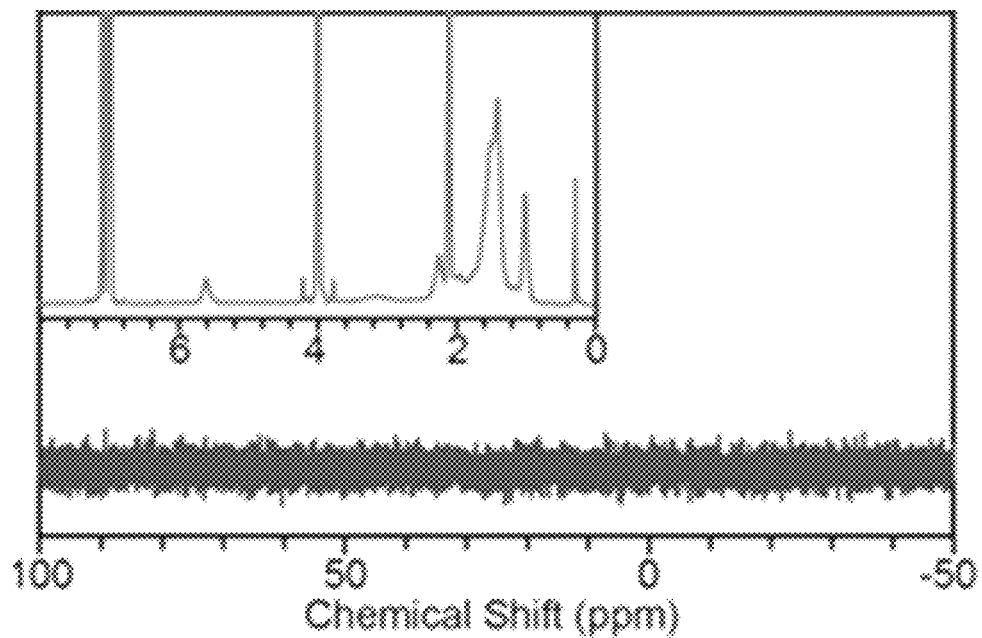
FIG. 11B shows $^{31}$P NMR spectra of the CdSe/CdS Nanoparticles, with $^1$H NMR spectra inset, of the CdSe/CdS_1 sample after the GPC purification according to Example 3.
Figure 11C:
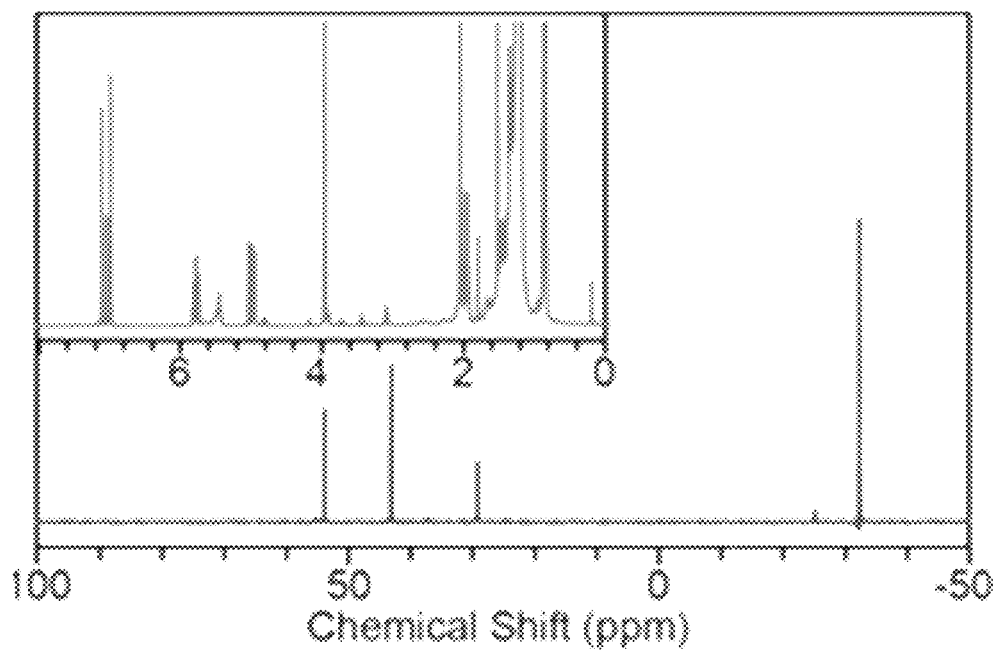
FIG. 11C shows $^{31}$P NMR spectra of the CdSe/CdS Nanoparticles, with $^1$H NMR spectra inset, of the CdSe/CdS_2 sample before the GPC purification according to Example 3.
Figure 11D:
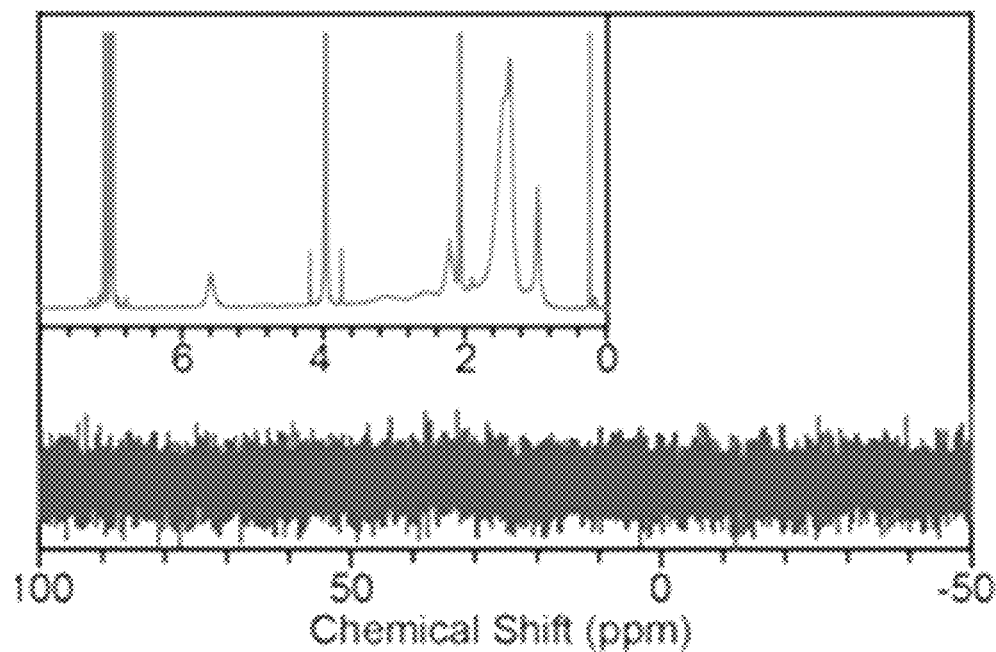
FIG. 11D shows $^{31}$P NMR spectra of the CdSe/CdS Nanoparticles, with $^1$H NMR spectra inset, of the CdSe/CdS_2 sample after the GPC purification according to Example 3.

Preparation: The CdSe/CdS nanoparticles are prepared by a published selective ionic layer adhesion reaction method (SILAR). The CdSe cores were prepared with a synthetic method that yielded a surface occupied by phosphonate ligands. A portion of as-synthesized CdSe core was diluted with hexane and flocculated by methanol and acetone. After decanting the supernatant, the QDs were redissolved into hexane and stored in a refrigerator (4° C.) for more than 12 hours. All the undissolved materials were removed by centrifugation and the sample was precipitated again by an addition of methanol and acetone. Afterward, the QDs were brought into a measured volume of hexane. The solution of QDs in hexane was transferred to a solvent of 1:2 oleylamine:ODE (v/v, 9 mL total) and degassed at 100° C. to remove hexane. Before the addition of the reagent via syringe pump, the system was heated to 200° C. under nitrogen. The metal precursor is prepared by diluting 0.2M Cd(oleate)$_2$ in Octadecene (ODE) with 2 equivalents of decylamine and a volume of TOP to yield a metal concentration of 0.1M. The S precursor was a 0.1M solution of (TMS)$_2$S in TOP. The volume increase associated with 1 monolayer coverage of CdS is calculated based on the radius increase of 3.37 Å, which is half of the wurtzite c-axis unit cell dimensions for CdS (3.37 Å). Alternating injections of metal precursor and sulfur precursor were performed, adding the metal precursor solution first, with injections starting every 15 minutes. The flow rate was adjusted to complete each injection over the course of 3 minutes. The volume of each injection was calculated to apply 0.8 monolayers coverage each cycle (a cycle is defined as one metal precursor injection and one sulfur precursor injection). 2 cycles were performed for the thin shell sample CdSe/CdS_1 and 5 cycles for the thick shell sample CdSe/CdS_2. After the reaction, the mixture was cooled down to the room temperature and the molar extinction coefficient was estimated based on the amount of the core introduced at the beginning and the total volume of the solution after the synthesis (CdSe/CdS_1, 1.34*10$^6$M$^{-1}$ cm$^{-1}$; CdSe/CdS_2, 3.6510$^6$M$^{-1}$ cm$^{-1}$). (See FIG. 10).

Purification results: As shown in the $^{31}$P NMR (FIG. 11A-11D), the phosphorus containing impurities have been completely removed in both samples. According to the $^1$H NMR (FIG. 11A-11D, insets), the amount of olefin protons also decreased significantly in these two samples (in CdSe/CdS_1 sample, the average olefin proton to quantum dot ratio decreases from 3554 to 258 after GPC purification; in CdSe/CdS_2 sample, the ratio decreases from 11100 to 595).

EXAMPLE 4

CdSe/CdZnS nanoparticles with different shell thickness (thin: CdSe/CdZnS_3; thick: CdSe/CdZnS_4): This example further demonstrated the method in which GPC can be used to isolate nanocrystal quantum dots in which the surface is composed of cadmium zinc sulfide. It also demonstrated the method in which nanoparticles of different size but with the similar surface composition can be isolated in solution by the exact same procedure. The ratio of surface ligands per nanoparticle in the purified product was found to increase with increasing nanoparticle size and surface area, demonstrating a method in which GPC is used to prepare a series of nanoparticle products with similar surface composition (for example, similar densities of ligand per unit surface area).

Figure 12:
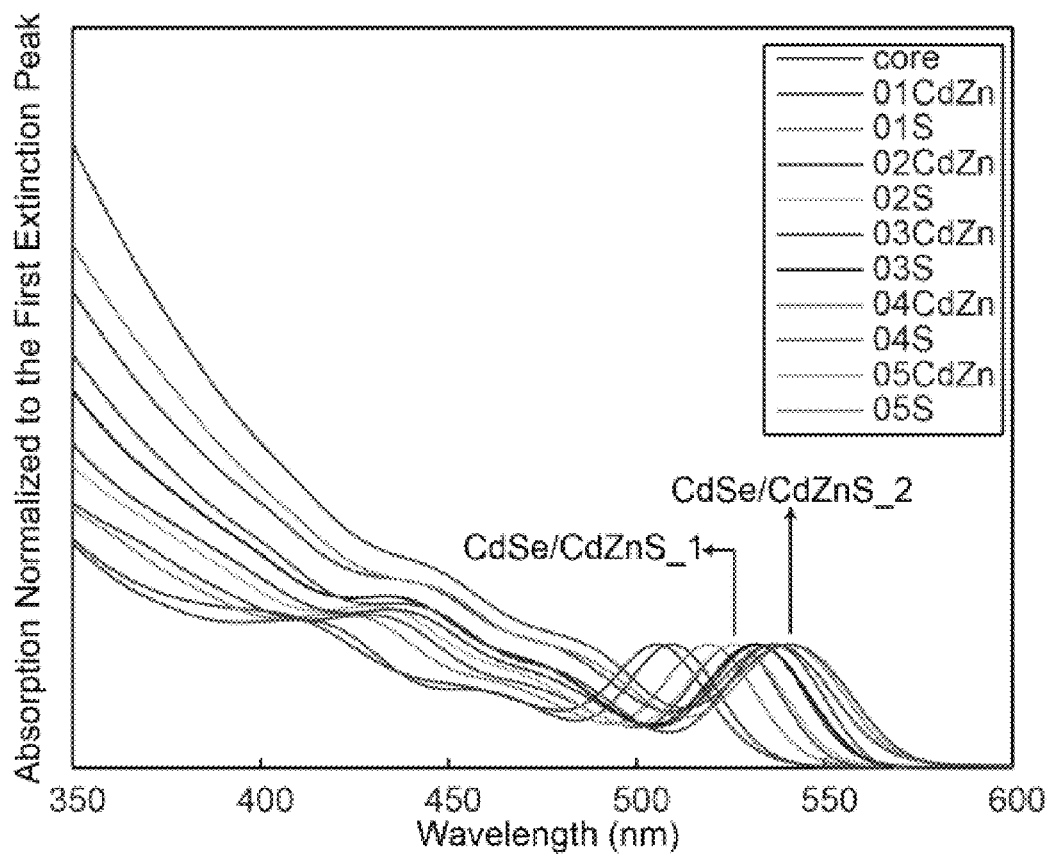
FIG. 12 shows the absorption spectrum of the CdZnS shell growth process according to Example 4.
Figure 13A:
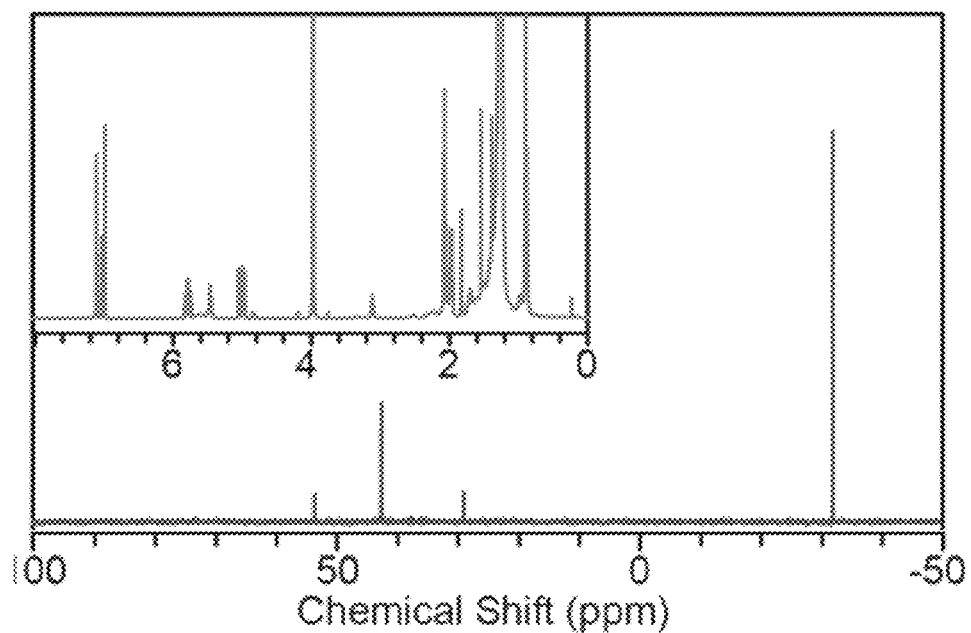
FIG. 13A shows $^{31}$P NMR spectra, with $^1$H NMR spectra inset, of the CdSe/CdZnS_3 sample before the GPC purification according to Example 4.
Figure 13B:
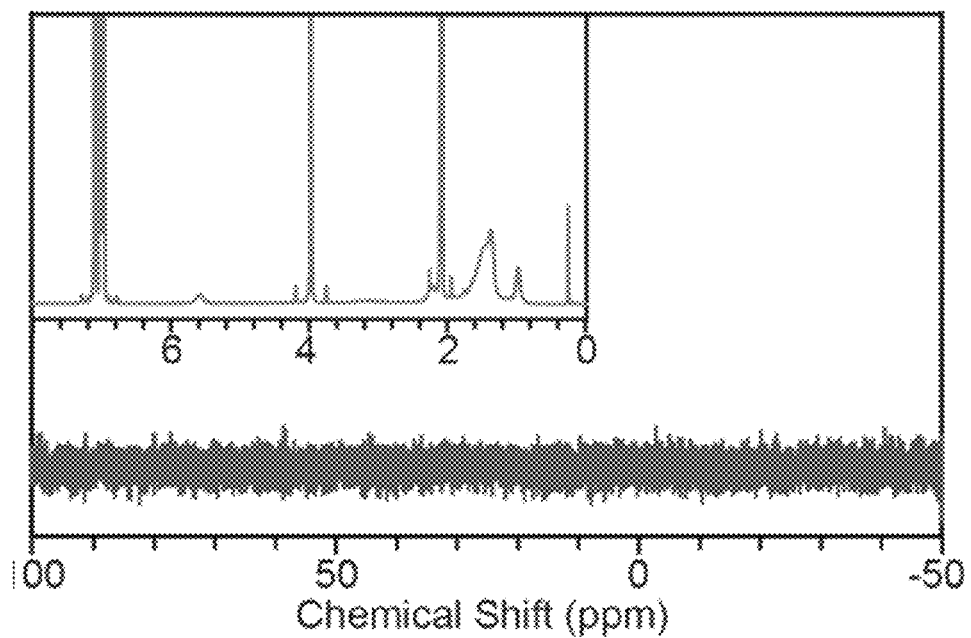
FIG. 13B shows $^{31}$P NMR spectra, with $^1$H NMR spectra inset, of the CdSe/CdZnS_3 sample after the GPC purification according to Example 4.
Figure 13C:
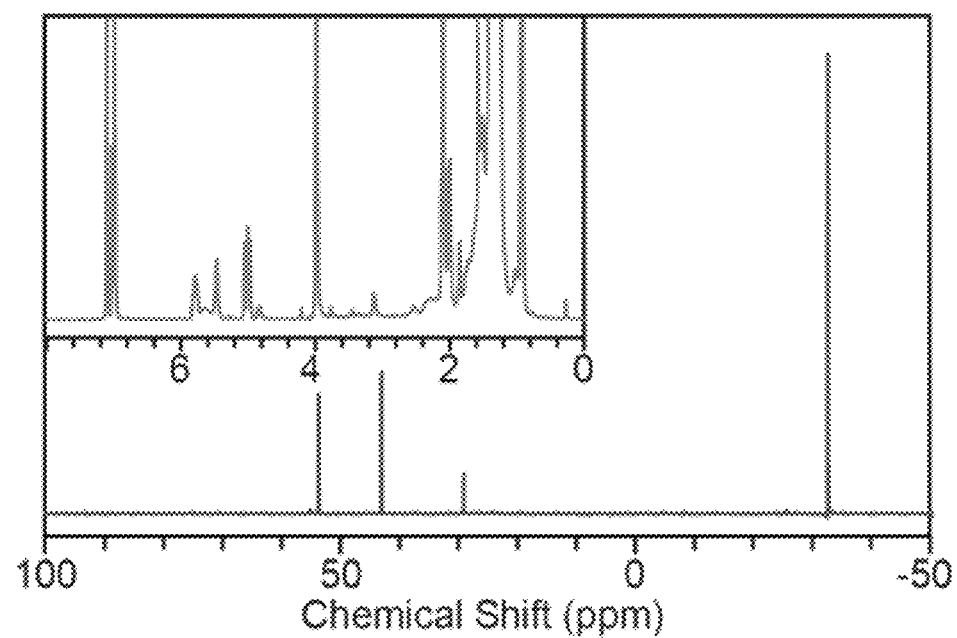
FIG. 13C shows $^{31}$P NMR spectra, with $^1$H NMR spectra inset, of the CdSe/CdZnS_4 sample before the GPC purification according to Example 4.
Figure 13D:
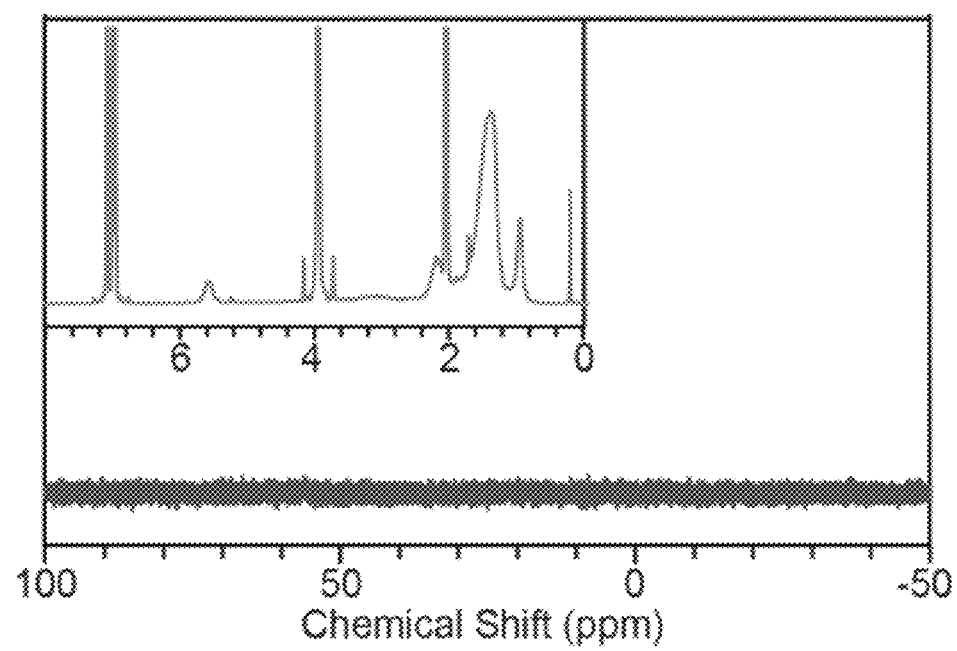
FIG. 13D shows $^{31}$P NMR spectra, with $^1$H NMR spectra inset, of the CdSe/CdZnS_4 sample after the GPC purification according to Example 4.

Preparation: The CdSe/CdZnS QDs were prepared in a similar way as the CdSe/CdS QDs, but instead of dosing pure Cd(Oleate)$_2$ as the metal precursor, a mixture of Cd(Oleate)$_2$ and Zn(Oleate)$_2$ (Cd to Zn ratio is 3:7) was used instead. The volume increase associated with 1 monolayer coverage of CdZnS is calculated based on the radius increase of 3.2 Å, which is the weighted average of half of the wurtzite c-axis unit cell dimensions for CdS (3.37 Å) and ZnS (3.13 Å). See FIG. 12.

NMR measurements were also performed on these two materials. (See FIG. 13A-13D). And again, all the phosphorus containing impurities have been removed and the olefin proton to QD ratio decreases significantly (from 3954 to 276 in CdSe/CdZnS_3 and from 5551 to 318 in CdSe/CdZnS_4).

EXAMPLE 5

CdSe/CdS Nanorods: This example demonstrated the method in which GPC was used to isolate colloidal nanocrystals with anisotropic overall shapes: in this case, rod-shaped nanocrystals in which the length differs significantly from the width. It also demonstrated the method in which GPC can be used to isolate colloidal nanocrystals with a mixture of ligand species present at the surface, in particular hexylphosphonic acid and octadecylphosphonic acid derivatives.

Figure 14A:
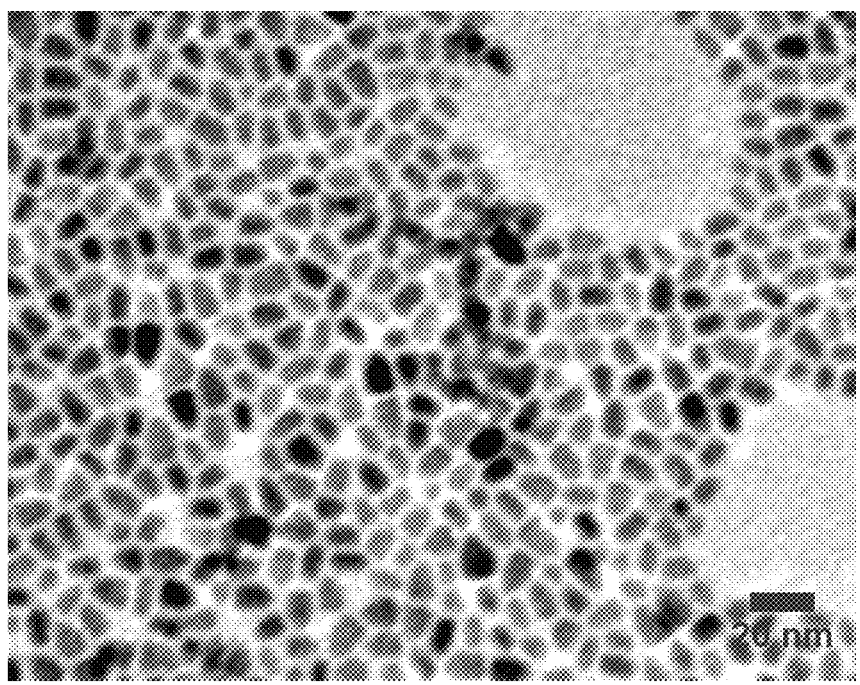
FIG. 14A shows a TEM image of the CdSe/CdS_NR_1 sample, according to Example 5.
Figure 14B:
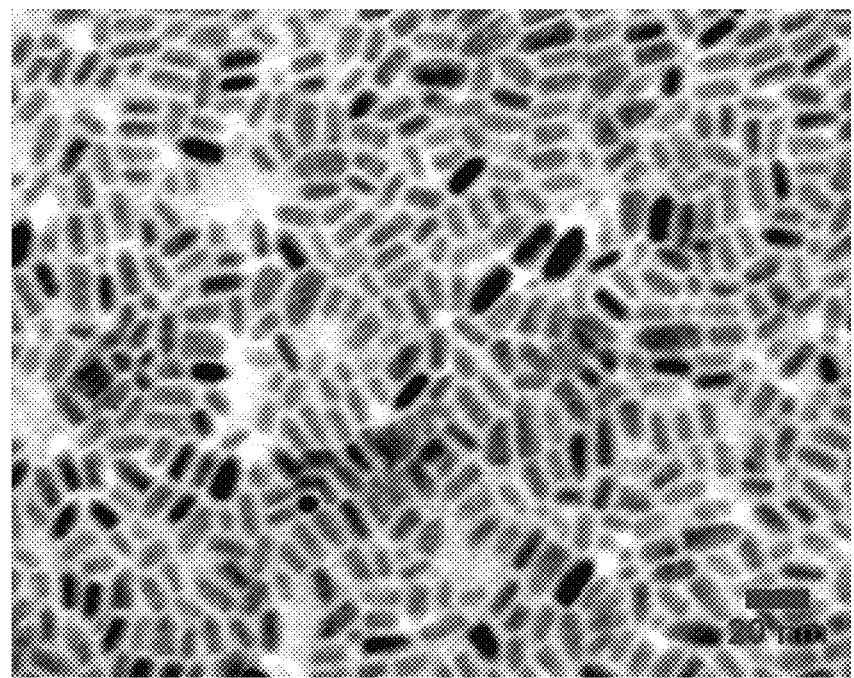
FIG. 14B shows a TEM image of the CdSe/CdS_NR_2 sample, according to Example 5.
Figure 15A:
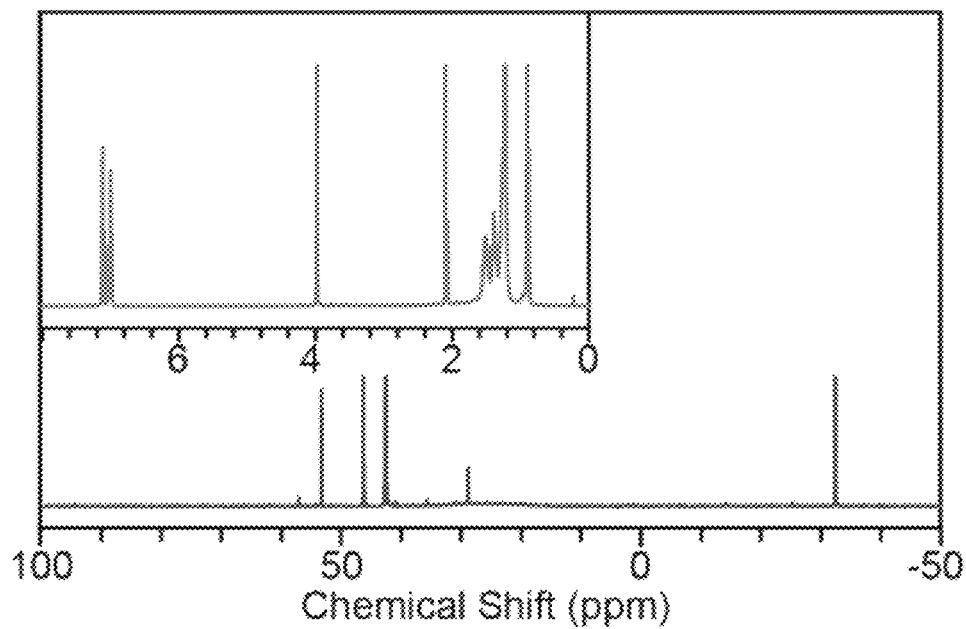
FIG. 15A shows $^{31}$P NMR spectra, with $^1$H NMR spectra inset, of the CdSe/CdS_NR_1 sample before the GPC purification according to Example 5.
Figure 15B:
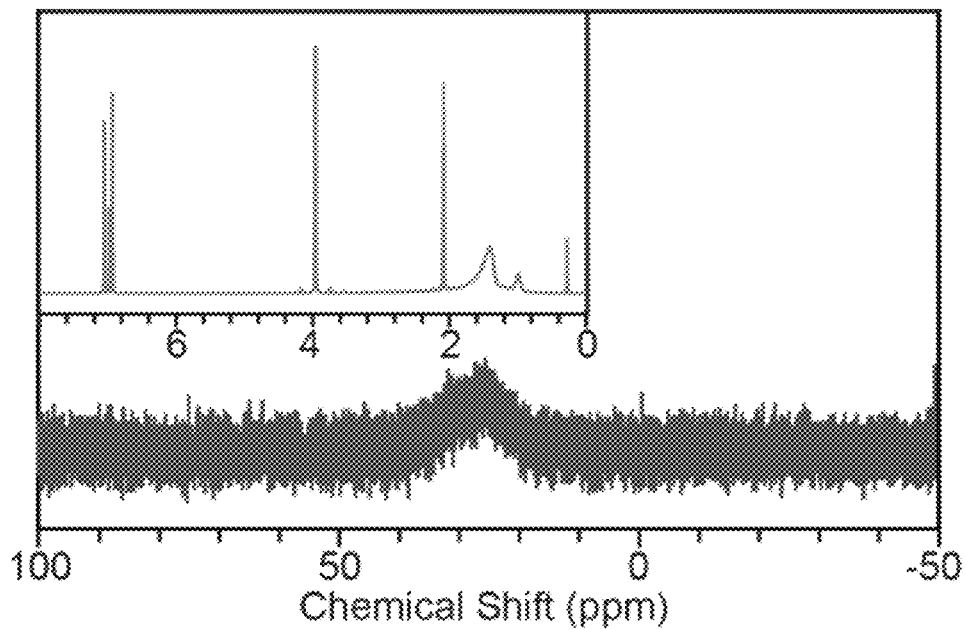
FIG. 15B shows $^{31}$P NMR spectra, with $^1$H NMR spectra inset, of the CdSe/CdS_NR_1 sample after the GPC purification according to Example 5.
Figure 15C:
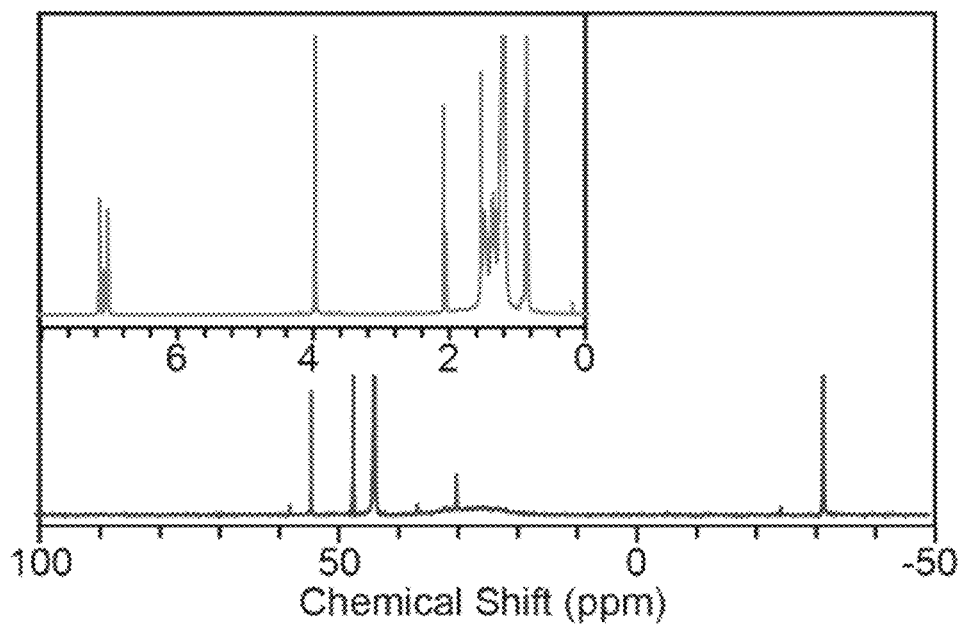
FIG. 15C shows $^{31}$P NMR spectra, with $^1$H NMR spectra inset, of the CdSe/CdS_NR_2 sample before the GPC purification according to Example 5.
Figure 15D:
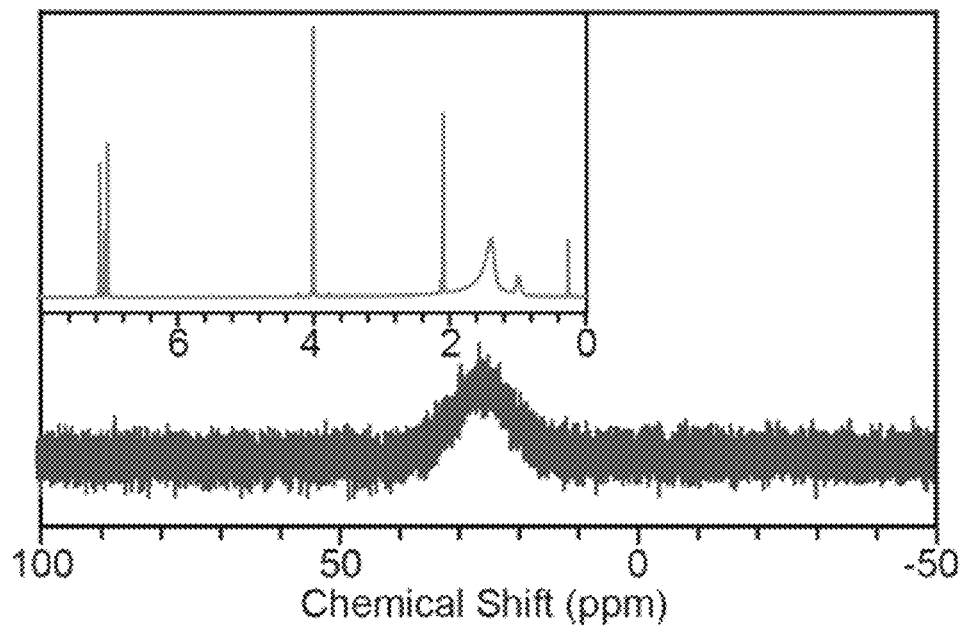
FIG. 15D shows $^{31}$P NMR spectra, with $^1$H NMR spectra inset, of the CdSe/CdS_NR_2 sample after the GPC purification according to Example 5.

Preparation: The nanorods were synthesized based on a published work. The Cd precursor for CdSe/CdS_NR_1 (FIG. 14A) was a mixture of Cd phosphonate in TOPO (92 mg CdO, 291 mg octadecylphosphonic acid (ODPA) and 80 mg hexylphosphonic acid (HPA) dissolved in 3 g TOPO). After heating the Cd precursor solution to 370° C., a mixture of 100 nmol phosphonate capped CdSe QDs in TOP and S precursor (60 mg S dissolved in 1.5 g TOP) was injected into the solution. The temperature was kept at above 350° C. for 10 minutes and then cooled down to the room temperature. CdSe/CdS_NR_2 (FIG. 14B) was prepared in the same method with higher amount of HPA (101 mg).

Figure 16:
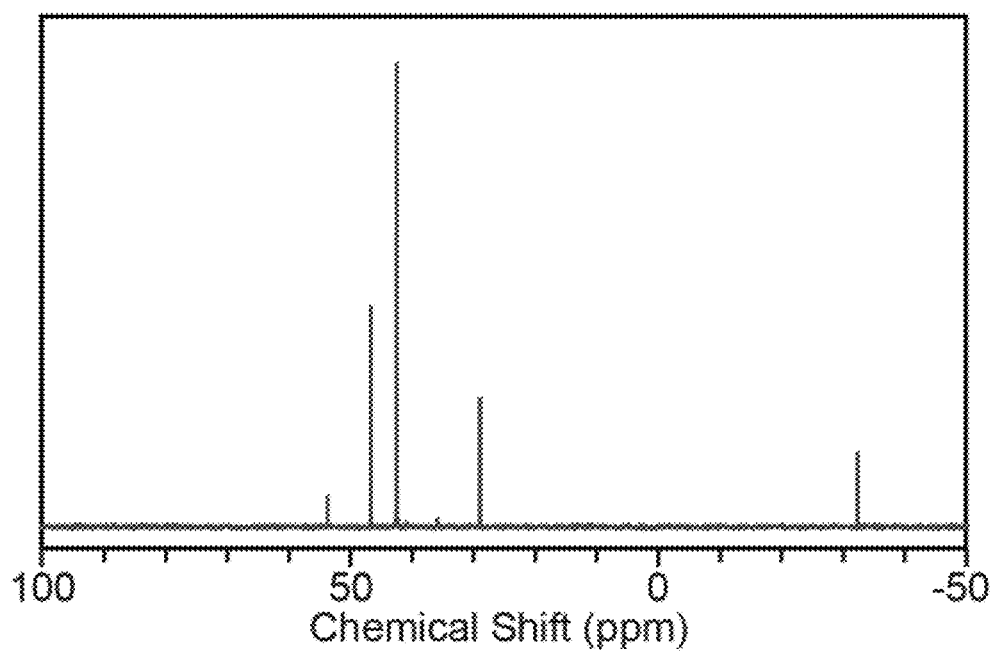
FIG. 16 shows the $^{31}$P NMR spectra of the impurities and excess ligands removed from CdSe/CdS_NR_2 sample by GPC, according to Example 5.
Figure 17:
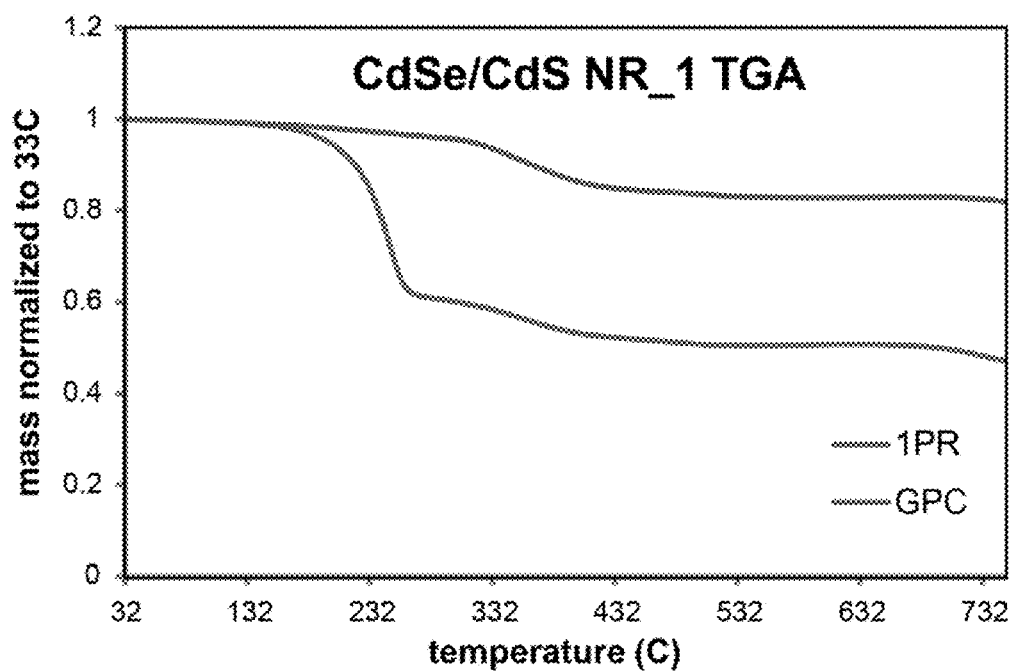
FIG. 17 shows the TGA curves of CdSe/CdS_NR_1 1PR (bottom line) and 1GPC (top line) samples, normalized to 32° C., according to Example 5.

Purification: $^{31}$P NMR results showed that after the GPC purification, the only remaining phosphorus containing chemical species are phosphonates bound to the nanorods (FIG. 15A-15D). All the other impurities were eluted from the column afterwards (FIG. 16). Due to limitations in precisely determining the extinction coefficient of the nanorods, the exact amount of ligands removed by GPC was not obtained. But by using $^1$H NMR with the internal standard and absorption spectra, it was calculated that the hydrogen per rod ratio has decreased 81.2% in CdSe/CdS_NR_1 sample and 82.9% in CdSe/CdS_NR_2 sample after purification. This result was further confirmed by the thermogravimetric analysis (FIG. 17) of the CdSe/CdS_NR_1 sample, where a higher mass loss was seen in the high temperature region that belongs to the breakdown of the organics.

EXAMPLE 6

Thiolate-capped Au Nanoparticles: This example demonstrated the methods in which GPC was used to isolate colloidal nanoparticles whose core is composed of an elemental solid, in which GPC was used to isolate colloidal nanoparticles whose core is composed of a metallic solid, and specifically in which the core is composed of gold. It also demonstrated the method in which GPC can be used to isolate colloidal nanoparticles in which the surface contains a ligand derived from a thiol compound.

Figure 18:
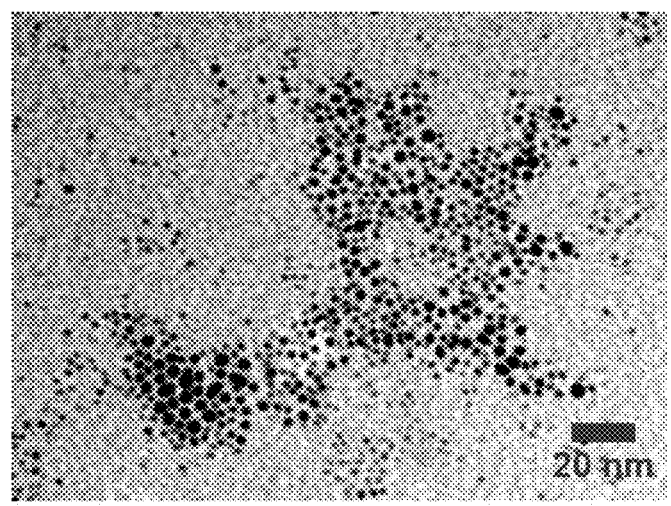
FIG. 18 shows a TEM image of the Au NPs sample, according to Example 6.

Preparation: The thiolate-capped Au nanoparticles (NPs) were prepared by a modified two phase liquid-liquid synthesis method designed by Mathias Brust and co-workers (FIG. 18). Briefly, tetrachloroaurate (AuCl$_4^-$) was transferred from aqueous solution to toluene by tetrabutylammonium bromide and then the AuCl$_4^-$ was reduced in the presence of dodecanethiol by stirring the toluene solution with aqueous sodium borohydride; the dodecanethiol functions as the ligand for the resulting reddish or black solution of Au nanoparticles.

Figure 19:
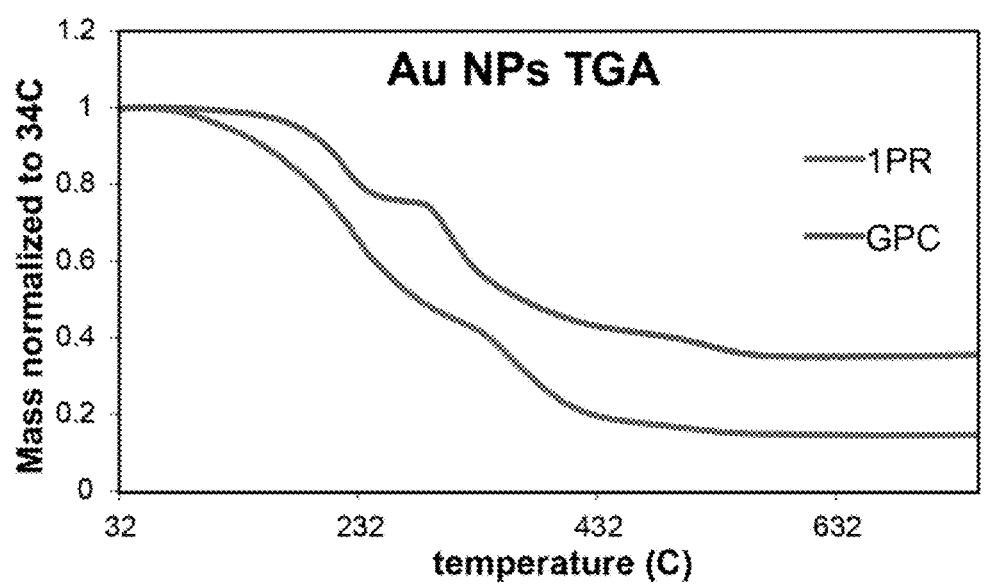
FIG. 19 shows the TGA curves of the Au NPs 1PR (bottom line) and 1GPC (top line) samples, normalized to 32° C., according to Example 6.

Purification: Loading, elution, and collection of the Au NPs via GPC was accomplished in the manner of Example 1 with a toluene mobile phase. According to the TGA results (FIG. 19), a significant reduction in the amount impurities and excess ligands has been achieved after the purification.

These and other modifications and variations to the present invention may be practiced by those of ordinary skill in the art, without departing from the spirit and scope of the present invention, which is more particularly set forth in the appended claims. In addition, it should be understood the aspects of the various embodiments may be interchanged both in whole or in part. Furthermore, those of ordinary skill in the art will appreciate that the foregoing description is by way of example only, and is not intended to limit the invention so further described in the appended claims.

What is claimed:

1. A method of purifying nanocrystals via gel permeation chromatography, the method comprising:
   loading a sample into a size exclusion chromatography column containing a non-polar stationary phase, the sample comprising
   a) a mobile phase,
   b) as-synthesized nanocrystals, each of the as-synthesized nanocrystals comprising a colloidal particle and a surface layer that is distinct from the colloidal particle, the surface layer including stabilizing ligands, the surface layer and the colloidal particle or an outer shell of the colloidal particle having been synthesized simultaneously to form the as-synthesized nanocrystals, and
   c) impurities, the impurities comprising one or more of an unreacted nanocrystal precursor, a nanocrystal formation by-product, and excess ligands, the mobile phase comprising a hydrophobic solvent in which the as-synthesized nanocrystals are miscible;
   passing the mobile phase through the chromatography column; and
   thereafter, collecting the mobile phase, the collected mobile phase carrying at least a portion of the as-synthesized nanocrystals, at least portion of the impurities being retained in the chromatography column.

2. The method as in claim 1, wherein the non-polar stationary phase comprises a material selected from the group consisting of a polystyrene material, a cross-linked dextran gel, a cross-linked polyacrylamide, and an agarose gel.

3. The method as in claim 1, wherein the hydrophobic solvent comprises a solvent selected from the group consisting of toluene, benzene, xylene, tetrahydrofuran, anisole, carbon tetrachloride, chloroform, dichloromethane, methylene chloride, perchloroethylene, dimethylformamide, pyridine, acetonitrile, trichlorobenzene, ketones, linear alkanes, branched alkanes, linear olefins, branched olefins, and mixtures thereof.

4. The method as in claim 1, further comprising allowing an elution volume to flow out of the chromatography column prior to collecting the mobile phase, wherein this elution volume is about one third of the total volume of the chromatography column.

5. The method as in claim 1, wherein more than 95% of the as-synthesized nanocrystals of the sample are included in about 2 mL of the collected mobile phase.

6. The method as in claim 1, wherein the colloidal particle comprises a material selected from the group consisting of a metal, a semiconductor, an oxide semiconductor, a ternary compound a quaternary compound, and a compound that contains polyatomic cations.

7. The method as in claim 1, wherein the stabilizing ligands comprise a material selected from the group consisting of carboxylic acids, carboxylates, phosphonic acids, phosphonates, pyrophosphonates, thiols, thiolates, dithiocarbamates, phosphines, phosphine oxides, metal carboxylate complexes, and metal phosphonate carboxylates.

8. The method as in claim 1, wherein the colloidal particles comprise quantum dots.

9. The method as in claim 1, wherein the colloidal particles comprise a core and a shell.

10. The method as in claim 1, further comprising following collection of the mobile phase, forming a shell on the as-synthesized nanocrystals carried in the collected mobile phase.

11. The method as in claim 1, wherein the as-synthesized nanocrystals carried by the collected mobile phase include about 595 stabilizing ligands per nanocrystal or less.

12. The method as in claim 1, further comprising, following collecting of the mobile phase, exchanging the stabilizing ligands of the as-synthesized nanocrystals carried by the collected mobile phase for different ligands.

13. The method as in claim 1, further comprising carrying out only a single precipitation/redissolution cycle prior to loading the sample into the chromatography column.

14. The method as in claim 1, further comprising reusing the column.

15. The method as in claim 14, wherein the column is reused more than 10 times.

16. The method as in claim 1, the collected mobile phase including a first portion and a second portion, the first portion carrying a first portion of the as-synthesized nanocrystals and the second portion carrying a second portion of the as-synthesized nanocrystals, the first portion of the as-synthesized nanocrystals having a different size than the second portion of the as-synthesized nanocrystals.

17. The method as in claim 1, the impurities of the sample comprising excess ligands, wherein the collected mobile phase includes no detectable excess ligands as determined by $^1$H NMR.

18. The method as in claim 1, the impurities of the sample comprising excess ligands that include an organic phosphonate, wherein the collected mobile phase includes no detectable excess ligands as determined by $^{31}$P NMR.

* * * * *